(12) United States Patent
Li et al.

(10) Patent No.: US 11,736,710 B2
(45) Date of Patent: *Aug. 22, 2023

(54) METHOD AND APPARATUS FOR VIDEO CODING

(71) Applicant: TENCENT AMERICA LLC, Palo Alto, CA (US)

(72) Inventors: Ling Li, Seoul (KR); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,969

(22) Filed: Mar. 1, 2022

(65) Prior Publication Data
US 2022/0182653 A1    Jun. 9, 2022

Related U.S. Application Data

(63) Continuation of application No. 17/096,674, filed on Nov. 12, 2020, now Pat. No. 11,303,914.

(Continued)

(51) Int. Cl.
H04N 19/00    (2014.01)
H04N 19/44    (2014.01)
(Continued)

(52) U.S. Cl.
CPC ........... *H04N 19/44* (2014.11); *H04N 19/117* (2014.11); *H04N 19/186* (2014.11);
(Continued)

(58) Field of Classification Search
CPC .... H04N 19/44; H04N 19/117; H04N 19/186; H04N 19/189; H04N 19/30; H04N 19/46; H04N 19/70; H04N 19/82
See application file for complete search history.

(56) References Cited

U.S. PATENT DOCUMENTS

2013/0022104 A1*  1/2013  Chen ............... H04N 19/46
                                               375/E7.027
2015/0016551 A1*  1/2015  Esenlik ........... H04N 19/80
                                               375/240.29
(Continued)

FOREIGN PATENT DOCUMENTS

RU    2660639 C1     7/2018
WO    2012/155553 A1  11/2012

OTHER PUBLICATIONS

International Search Report and Written Opinion dated Jun. 22, 2021 in Application No. PCT/US 20/64055.

(Continued)

*Primary Examiner* — Zhihan Zhou
(74) *Attorney, Agent, or Firm* — ArentFox Schiff LLP

(57) ABSTRACT

Aspects of the disclosure provide a method and an apparatus including processing circuitry for video decoding. The processing circuitry decodes, from a coded video bitstream, a first syntax element indicating whether a first component in the coded video bitstream is coded based on a second component in the coded video bitstream. The processing circuitry determines whether to decode one or more second syntax elements for a chroma related coding tool based on the first syntax element. The chroma related coding tool is a luma mapping with chroma scaling coding tool or a cross-component adaptive loop filter. The one or more second syntax elements are decoded when the first syntax element indicates that the first component is coded based on the second component. The one or more second syntax elements are not decoded when the first syntax element indicates that the first component is not coded based on the second component.

20 Claims, 36 Drawing Sheets

Related U.S. Application Data

(60) Provisional application No. 62/958,694, filed on Jan. 8, 2020.

(51) Int. Cl.
  *H04N 19/70* (2014.01)
  *H04N 19/46* (2014.01)
  *H04N 19/186* (2014.01)
  *H04N 19/117* (2014.01)
  *H04N 19/82* (2014.01)
  *H04N 19/30* (2014.01)
  *H04N 19/189* (2014.01)

(52) U.S. Cl.
  CPC .......... *H04N 19/189* (2014.11); *H04N 19/30* (2014.11); *H04N 19/46* (2014.11); *H04N 19/70* (2014.11); *H04N 19/82* (2014.11)

(56) References Cited

U.S. PATENT DOCUMENTS

| | | | |
|---|---|---|---|
| 2017/0105014 A1* | 4/2017 | Lee | H04N 19/85 |
| 2018/0063527 A1 | 3/2018 | Chen et al. | |
| 2021/0067774 A1* | 3/2021 | Yasugi | H04N 19/82 |
| 2021/0152841 A1* | 5/2021 | Hu | H04N 19/82 |
| 2021/0160513 A1* | 5/2021 | Hu | H04N 19/117 |

OTHER PUBLICATIONS

Misra et al., Kiran; On Cross Component Adaptive Loop Filter for Video Compression, 2019 Picture Coding Symposium (PCS), Nov. 12-15, 2019, Ningbo, China.

Russian Office Action dated May 26, 2022 in corresponding Application No. 2021128890/28(061229) with English Translation (16 pages).

Japanese Office Action dated Sep. 5, 2022 in Application No. 2021-557978 with English Translation (10 pages).

Ling Li et al., "AHG12: Signaling of chroma presence in PPS and APS", Joint Video Experts Team (JVET), Jan. 1, 2020, [JVET-Q0420-v1], pp. 1-4.

K. Misra et al., "CE5 Common Base: Cross Component Adaptive Loop Filter", Joint Video Experts Team (JVET), Dec. 23, 2019, [JVET-Q0058], pp. 1-11.

* cited by examiner

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
|     profile_tier_level( 1, sps_max_sub_layers_minus1 ) | |
| gdr_enabled_flag | u(1) |
| sps_seq_parameter_set_id | u(4) |
| chroma_format_idc | u(2) |
| if( chroma_format_idc = = 3 ) | |
|     separate_colour_plane_flag | u(1) |
| ref_pic_resampling_enabled_flag | u(1) |
| sps_seq_parameter_set_id | ue(v) |
| chroma_format_idc | ue(v) |
| if( chroma_format_idc = = 3 ) | |
|     separate_colour_plane_flag | u(1) |
| pic_width_max_in_luma_samples | ue(v) |
| pic_height_max_in_luma_samples | ue(v) |
| sps_log2_ctu_size_minus5 | u(2) |
| subpics_present_flag | u(1) |

FIG. 9A

*Continued from FIG. 9A*

| | |
|---|---|
| sps_num_subpics_minus1 | u(8) |
| for( i = 0; i <= sps_num_subpics_minus1; i++ ) { | |
|    subpic_ctu_top_left_x[ i ] | u(v) |
|    subpic_ctu_top_left_y[ i ] | u(v) |
|    subpic_width_minus1[ i ] | u(v) |
|    subpic_height_minus1[ i ] | u(v) |
|    subpic_treated_as_pic_flag[ i ] | u(1) |
|    loop_filter_across_subpic_enabled_flag[ i ] | u(1) |
|    } | |
| } | |
| sps_subpic_id_present_flag | u(1) |
| if( sps_subpics_id_present_flag ) { | |
|    sps_subpic_id_signalling_present_flag | u(1) |
|    if( sps_subpics_id_signalling_present_flag ) { | |
|      sps_subpic_id_len_minus1 | ue(v) |
|      for( i = 0; i <= sps_num_subpics_minus1; i++ ) | |
|         sps_subpic_id[ i ] | u(v) |
|    } | |
| } | |
| bit_depth_minus8 | ue(v) |
| min_qp_prime_ts_minus4 | ue(v) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|    poc_msb_len_minus1 | ue(v) |
| if( sps_max_sub_layers_minus1 > 0 ) | |
|    sps_sub_layer_dpb_params_flag | u(1) |
| if( sps_ptl_dpb_hrd_params_present_flag ) | |
|    dpb_parameters( 0, sps_max_sub_layers_minus1, sps_sub_layer_dpb_params_flag ) | |

FIG. 9B

Continued from FIG. 9B

| | |
|---|---|
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|   for( j = 0; j < num_ref_pic_lists_in_sps[ i ]; j++) | |
|     ref_pic_list_struct( i, j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |

FIG. 9C

*Continued from FIG. 9C*

| | |
|---|---|
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|    sps_log2_diff_max_bt_min_qt_intra_slice_luma | ue(v) |
|    sps_log2_diff_max_tt_min_qt_intra_slice_luma | ue(v) |
| } | |
| if( sps_max_mtt_hierarchy_depth_inter_slice != 0 ) { | |
|    sps_log2_diff_max_bt_min_qt_inter_slice | ue(v) |
|    sps_log2_diff_max_tt_min_qt_inter_slice | ue(v) |
| } | |
| if( qtbtt_dual_tree_intra_flag ) { | |
|    sps_log2_diff_min_qt_min_cb_intra_slice_chroma | ue(v) |
|    sps_max_mtt_hierarchy_depth_intra_slice_chroma | ue(v) |
|    if( sps_max_mtt_hierarchy_depth_intra_slice_chroma != 0 ) { | |
|      sps_log2_diff_max_bt_min_qt_intra_slice_chroma | ue(v) |
|      sps_log2_diff_max_tt_min_qt_intra_slice_chroma | ue(v) |
|    } | |
| } | |
| sps_max_luma_transform_size_64_flag | u(1) |
| sps_joint_cbcr_enabled_flag | u(1) |
| if( ChromaArrayType != 0 ) { | |
|    same_qp_table_for_chroma | u(1) |
|    numQpTables = same_qp_table_for_chroma ? 1 : ( sps_joint_cbcr_enabled_flag ? 3 : 2 ) | |
|    for( i = 0; i < numQpTables; i++ ) { | |
|      qp_table_start_minus26[ i ] | se(v) |
|      num_points_in_qp_table_minus1[ i ] | ue(v) |
|      for( j = 0; j <= num_points_in_qp_table_minus1[ i ]; j++ ) { | |
|         delta_qp_in_val_minus1[ i ][ j ] | ue(v) |
|         delta_qp_diff_val[ i ][ j ] | ue(v) |
|      } | |
|    } | |
| } | |

910 points to the block containing the intra/inter slice syntax.

FIG. 9D

Continued from FIG. 9D

| | |
|---|---|
| sps_sao_enabled_flag | u(1) |
| sps_alf_enabled_flag | u(1) |
| sps_transform_skip_enabled_flag | u(1) |
| if( sps_transform_skip_enabled_flag ) | |
|    sps_bdpcm_enabled_flag | u(1) |
|    if( sps_bdpcm_enabled_flag && chroma_format_idc == 3 ) | |
|      sps_bdpcm_chroma_enabled_flag | u(1) |
| sps_ref_wraparound_enabled_flag | u(1) |
| if( sps_ref_wraparound_enabled_flag ) | |
|    sps_ref_wraparound_offset_minus1 | ue(v) |
| sps_temporal_mvp_enabled_flag | u(1) |
| if( sps_temporal_mvp_enabled_flag ) | |
|    sps_sbtmvp_enabled_flag | u(1) |
| sps_amvr_enabled_flag | u(1) |
| sps_bdof_enabled_flag | u(1) |
| if( sps_bdof_enabled_flag ) | |
|    sps_bdof_pic_present_flag | u(1) |
| sps_smvd_enabled_flag | u(1) |
| sps_dmvr_enabled_flag | u(1) |
| if( sps_dmvr_enabled_flag) | |
|    sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |

*Continued from FIG. 9E*

| | |
|---|---|
| if( ChromaArrayType != 0 ) | |
|    sps_cclm_enabled_flag | u(1) |
|    if( sps_cclm_enabled_flag && chroma_format_idc == 1 ) [Ed. (JC): should sps_cclm_colocated_chroma_flag also be signalled for 422 case since it's used in the decoding process, to be confirmed] | |
|       sps_cclm_colocated_chroma_flag | u(1) |
| sps_mts_enabled_flag | u(1) |
| if( sps_mts_enabled_flag ) { | |
|    sps_explicit_mts_intra_enabled_flag | u(1) |
|    sps_explicit_mts_inter_enabled_flag | u(1) |
| } | |
| sps_sbt_enabled_flag | u(1) |
| sps_affine_enabled_flag | u(1) |
| if( sps_affine_enabled_flag ) { | |
|    sps_affine_type_flag | u(1) |
|    sps_affine_amvr_enabled_flag | u(1) |
|    sps_affine_prof_enabled_flag | u(1) |
|    if( sps_affine_prof_enabled_flag ) | |
|       sps_prof_pic_present_flag | u(1) |
| } | |
| if( chroma_format_idc == 3 ) { | |
|    sps_palette_enabled_flag | u(1) |
|    sps_act_enabled_flag | u(1) |
| } | |
| sps_bcw_enabled_flag | u(1) |
| sps_ibc_enabled_flag | u(1) |
| sps_ciip_enabled_flag | u(1) |
| if( sps_mmvd_enabled_flag ) | |
|    sps_fpel_mmvd_enabled_flag | u(1) |
| sps_triangle_enabled_flag | u(1) |
| sps_lmcs_enabled_flag | u(1) |
| sps_lfnst_enabled_flag | u(1) |

*Continued from FIG. 9F*

| | |
|---|---|
| sps_ladf_enabled_flag | u(1) |
| if( sps_ladf_enabled_flag ) { | |
|    sps_num_ladf_intervals_minus2 | u(2) |
|    sps_ladf_lowest_interval_qp_offset | se(v) |
|    for( i = 0; i < sps_num_ladf_intervals_minus2 + 1; i++ ) { | |
|      sps_ladf_qp_offset[ i ] | se(v) |
|      sps_ladf_delta_threshold_minus1[ i ] | ue(v) |
|    } | |
| } | |
| sps_scaling_list_enabled_flag | u(1) |
| sps_loop_filter_across_virtual_boundaries_disabled_present_flag | u(1) |
| if( sps_loop_filter_across_virtual_boundaries_disabled_present_flag ) { | |
|    sps_num_ver_virtual_boundaries | u(2) |
|    for( i = 0; i < sps_num_ver_virtual_boundaries; i++ ) | |
|      sps_virtual_boundaries_pos_x[ i ] | u(13) |
|    sps_num_hor_virtual_boundaries | u(2) |
|    for( i = 0; i < sps_num_hor_virtual_boundaries; i++ ) | |
|      sps_virtual_boundaries_pos_y[ i ] | u(13) |
| } | |
| if( sps_ptl_dpb_hrd_params_present_flag ) { | |
|    sps_general_hrd_params_present_flag | u(1) |
|    if( sps_general_hrd_params_present_flag ) { | |
|      general_hrd_parameters( ) | |
|      if( sps_max_sub_layers_minus1 > 0 ) | |
|        sps_sub_layer_cpb_params_present_flag | u(1) |
|      firstSubLayer = sps_sub_layer_cpb_params_present_flag ? 0 :<br>       sps_max_sub_layers_minus1 | |
|      ols_hrd_parameters( firstSubLayer, sps_max_sub_layers_minus1 ) | |
|    } | |
| } | |
| vui_parameters_present_flag | u(1) |
| if( vui_parameters_present_flag ) | |
|    vui_parameters( ) | |
| sps_extension_flag | u(1) |
| if( sps_extension_flag ) | |
|    while( more_rbsp_data( ) ) | |
|      sps_extension_data_flag | u(1) |
| rbsp_trailing_bits( ) | |
| } | |

FIG. 9G

| pic_parameter_set_rbsp( ) { | Descriptor |
|---|---|
|   pps_pic_parameter_set_id | ue(v) |
|   pps_seq_parameter_set_id | u(4) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   scaling_window_flag | u(1) |
|   if( scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |

FIG. 10A

*Continued from FIG. 10A*

| | |
|---|---|
| if( !no_pic_partition_flag ) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num_exp_tile_columns_minus1; i++ ) | |
|     tile_column_width_minus1[ i ] | ue(v) |
|   for( i = 0; i <= num_exp_tile_rows_minus1; i++ ) | |
|     tile_row_height_minus1[ i ] | ue(v) |
|   rect_slice_flag | u(1) |
|   if( rect_slice_flag ) | |
|     single_slice_per_subpic_flag | u(1) |
|   if( rect_slice_flag && !single_slice_per_subpic_flag ) { | |
|     num_slices_in_pic_minus1 | ue(v) |
|     tile_idx_delta_present_flag | u(1) |
|     for( i = 0; i < num_slices_in_pic_minus1; i++ ) { | |
|       slice_width_in_tiles_minus1[ i ] | ue(v) |
|       slice_height_in_tiles_minus1[ i ] | ue(v) |
|       if( slice_width_in_tiles_minus1[ i ] == 0 &&<br>          slice_height_in_tiles_minus1[ i ] == 0 ) { | |
|         num_slices_in_tile_minus1[ i ] | ue(v) |
|         numSlicesInTileMinus1 = num_slices_in_tile_minus1[ i ] | |
|         for( j = 0; j < numSlicesInTileMinus1; j++ ) | |
|           slice_height_in_ctu_minus1[ i++ ] | ue(v) |
|       } | |
|       if( tile_idx_delta_present_flag && i < num_slices_in_pic_minus1 ) | |
|         tile_idx_delta[ i ] | se(v) |
|     } | |
|   } | |
|   loop_filter_across_tiles_enabled_flag | u(1) |
|   loop_filter_across_slices_enabled_flag | u(1) |
| } | |

FIG. 10B

*Continued from FIG. 10B*

| | |
|---|---|
| entropy_coding_sync_enabled_flag | u(1) |
| if( !no_pic_partition_flag \|\| entropy_coding_sync_enabled_flag ) | |
|    entry_point_offsets_present_flag | u(1) |
| cabac_init_present_flag | u(1) |
| for( i = 0; i < 2; i++ ) | |
|    num_ref_idx_default_active_minus1[ i ] | ue(v) |
| rpl1_idx_present_flag | u(1) |
| init_qp_minus26 | se(v) |
| if( sps_transform_skip_enabled_flag ) | |
|    log2_transform_skip_max_size_minus2 | ue(v) |
| cu_qp_delta_enabled_flag | u(1) |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
|    pps_joint_cbcr_qp_offset_value | se(v) |
| pps_slice_chroma_qp_offsets_present_flag | u(1) |
| pps_cu_chroma_qp_offset_list_enabled_flag | u(1) |
| if( pps_cu_chroma_qp_offset_list_enabled_flag ) { | |
|    chroma_qp_offset_list_len_minus1 | ue(v) |
|    for( i = 0; i <= chroma_qp_offset_list_len_minus1; i++ ) { | |
|      cb_qp_offset_list[ i ] | se(v) |
|      cr_qp_offset_list[ i ] | se(v) |
|      if( pps_joint_cbcr_qp_offset_present_flag ) | |
|         joint_cbcr_qp_offset_list[ i ] | se(v) |
|    } | |
| } | |

FIG. 10C

*Continued from FIG. 10C*

| | |
|---|---|
| pps_weighted_pred_flag | u(1) |
| pps_weighted_bipred_flag | u(1) |
| deblocking_filter_control_present_flag | u(1) |
| if( deblocking_filter_control_present_flag ) { | |
|    deblocking_filter_override_enabled_flag | u(1) |
|    pps_deblocking_filter_disabled_flag | u(1) |
|    if( !pps_deblocking_filter_disabled_flag ) { | |
|      pps_beta_offset_div2 | se(v) |
|      pps_tc_offset_div2 | se(v) |
|    } | |
| } | |
| constant_slice_header_params_enabled_flag | u(1) |
| if( constant_slice_header_params_enabled_flag ) { | |
|    pps_dep_quant_enabled_idc | u(2) |
|    for( i = 0; i < 2; i++ ) | |
|      pps_ref_pic_list_sps_idc[ i ] | u(2) |
|    pps_mvd_l1_zero_idc | u(2) |
|    pps_collocated_from_l0_idc | u(2) |
|    pps_six_minus_max_num_merge_cand_plus1 | ue(v) |
|    pps_max_num_merge_cand_minus_max_num_triangle_cand_plus1 | ue(v) |
| } | |
| picture_header_extension_present_flag | u(1) |
| slice_header_extension_present_flag | u(1) |
| pps_extension_flag | u(1) |
| if( pps_extension_flag ) | |
|    while( more_rbsp_data( ) ) | |
|      pps_extension_data_flag | u(1) |
| rbsp_trailing_bits( ) | |
| } | |

FIG. 10D

| alf_data( ) { | Descriptor |
|---|---|
|     alf_luma_filter_signal_flag | u(1) |
|     alf_chroma_filter_signal_flag | u(1) |
|     if( alf_luma_filter_signal_flag ) { | |
|         alf_luma_clip_flag | u(1) |
|         alf_luma_num_filters_signalled_minus1 | ue(v) |
|         if( alf_luma_num_filters_signalled_minus1 > 0 ) { | |
|             for( filtIdx = 0; filtIdx < NumAlfFilters; filtIdx++ ) | |
|                 alf_luma_coeff_delta_idx[ filtIdx ] | u(v) |
|         } | |
|         for( sfIdx = 0; sfIdx <= alf_luma_num_filters_signalled_minus1; sfIdx++ ) { | |
|             for( j = 0; j < 12; j++ ) { | |
|                 alf_luma_coeff_abs[ sfIdx ][ j ] | uek(v) |
|                 if( alf_luma_coeff_abs[ sfIdx ][ j ] ) | |
|                     alf_luma_coeff_sign[ sfIdx ][ j ] | u(1) |
|             } | |
|         } | |
|         if( alf_luma_clip_flag ) { | |
|             for( sfIdx = 0; sfIdx <= alf_luma_num_filters_signalled_minus1; sfIdx++ ) { | |
|                 for( j = 0; j < 12; j++ ) | |
|                     alf_luma_clip_idx[ sfIdx ][ j ] | u(2) |
|             } | |
|         } | |
|     } | |

FIG. 11A

Continued from FIG. 11A

| seq_parameter_set_rbsp( ) { | Descriptor |
|---|---|
| ... | |
| ~~sps_joint_cbcr_enabled_flag~~ | ~~u(1)~~ |
| if( ChromaArrayType != 0 ) { | u(1) |
| sps_joint_cbcr_enabled_flag | |
| same_qp_table_for_chroma | u(1) |
| numQpTables = same_qp_table_for_chroma ? 1 : ( sps_joint_cbcr_enabled_flag ? 3 : 2 ) | |
| for( i = 0; i < numQpTables; i++ ) { | |
| qp_table_start_minus26[ i ] | se(v) |
| num_points_in_qp_table_minus1[ i ] | ue(v) |
| for( j = 0; j <= num_points_in_qp_table_minus1[ i ]; j++ ) { | |
| delta_qp_in_val_minus1[ i ][ j ] | ue(v) |
| delta_qp_diff_val[ i ][ j ] | ue(v) |
| } | |
| } | |
| } | |
| ... | |
| } | |

*FIG. 12*

| 1301 | seq_parameter_set_rbsp( ) { | Descriptor |
|---|---|---|
| | ... | |
| | if( sps_bdpcm_enabled_flag && ChromaArrayType==3) | |
| |     sps_bdpcm_chroma_enabled_flag | u(1) |
| | ... | |
| | if( ChromaArrayType == 3 ) { | |
| |     sps_palette_enabled_flag | u(1) |
| |     sps_act_enabled_flag | u(1) |
| | } | |
| | ... | |
| 1302 | } | |

FIG. 13

| pic_parameter_set_rbsp( ) { | Descriptor |
|---|---|
| ... | |
|   pps_chroma_present_flag | u(1) |
|   if( pps_chroma_present_flag ) { | |
|     pps_cb_qp_offset | se(v) |
|     pps_cr_qp_offset | se(v) |
|     pps_joint_cbcr_qp_offset_present_flag | u(1) |
|     pps_slice_chroma_qp_offsets_present_flag | u(1) |
|     pps_cu_chroma_qp_offset_list_enabled_flag | u(1) |
|   } | |
| ... | |
| } | |

FIG. 14

| adaptation_parameter_set_rbsp( ) { | Descriptor |
|---|---|
| adaptation_parameter_set_id | u(5) |
| aps_params_type | u(3) |
| aps_chroma_present_flag | u(1) |
| if( aps_params_type = = ALF_APS ) | |
|   alf_data( ) | |
| else if( aps_params_type = = LMCS_APS ) | |
|   lmcs_data( ) | |
| else if( aps_params_type = = SCALING_APS ) | |
|   scaling_list_data( ) | |
| aps_extension_flag | u(1) |
| if( aps_extension_flag ) | |
|   while( more_rbsp_data( ) ) | |
|     aps_extension_data_flag | u(1) |
| rbsp_trailing_bits( ) | |
| } | |

| 1601 | alf_data( ) { | Descriptor |
|---|---|---|
| | alf_luma_filter_signal_flag | u(1) |
| | if( aps_chroma_present_flag ) | |
| | alf_chroma_filter_signal_flag | u(1) |
| | ... | |
| | if( alf_chroma_filter_signal_flag ) { | |
| | alf_chroma_num_alt_filters_minus1 | ue(v) |
| | for( altIdx = 0; altIdx <= alf_chroma_num_alt_filters_minus1; altIdx++ ) { | |
| | alf_chroma_clip_flag[ altIdx ] | u(1) |
| | for( j = 0; j < 6; j++ ) { | |
| | alf_chroma_coeff_abs[ altIdx ][ j ] | uek(v) |
| | if( alf_chroma_coeff_abs[ altIdx ][ j ] > 0 ) | |
| | alf_chroma_coeff_sign[ altIdx ][ j ] | u(1) |
| | } | |
| | if( alf_chroma_clip_flag[ altIdx ] ) { | |
| | for( j = 0; j < 6; j++ ) | |
| | alf_chroma_clip_idx[ altIdx ][ j ] | u(2) |
| | } | |
| | } | |
| | } | |
| | } | |

FIG. 16  1602

| | Descriptor |
|---|---|
| lmcs_data( ) { | |
|   lmcs_min_bin_idx | ue(v) |
|   lmcs_delta_max_bin_idx | ue(v) |
|   lmcs_delta_cw_prec_minus1 | ue(v) |
|   for( i = lmcs_min_bin_idx; i <= LmcsMaxBinIdx; i++ ) { | |
|     lmcs_delta_abs_cw[ i ] | u(v) |
|     if( lmcs_delta_abs_cw[ i ] > 0 ) | |
|       lmcs_delta_sign_cw_flag[ i ] | u(1) |
|   } | |
|   if (aps_chroma_present_flag) { | |
|     lmcs_delta_abs_crs | u(3) |
|     if( lmcs_delta_abs_crs > 0 ) | |
|       lmcs_delta_sign_crs_flag | u(1) |
|   } | |
| } | |

| alf_data( ) { | Descriptor |
|---|---|
|     alf_luma_filter_signal_flag | u(1) |
|     if( aps_chroma_present_flag ) { | |
|         alf_chroma_filter_signal_flag | u(1) |
|         alf_cross_component_cb_filter_signal_flag | u(1) |
|         alf_cross_component_cr_filter_signal_flag | u(1) |
|     } | |
|     if( alf_luma_filter_signal_flag ) { | |
|         alf_luma_clip_flag | u(1) |
|         alf_luma_num_filters_signalled_minus1 | ue(v) |
|         if( alf_luma_num_filters_signalled_minus1 > 0 ) { | |
|             for( filtIdx = 0; filtIdx < NumAlfFilters; filtIdx++ ) | |
|                 alf_luma_coeff_delta_idx[ filtIdx ] | u(v) |
|         } | |
|         for( sfIdx = 0; sfIdx <= alf_luma_num_filters_signalled_minus1; sfIdx++ ) { | |
|             for( j = 0; j < 12; j++ ) { | |
|                 alf_luma_coeff_abs[ sfIdx ][ j ] | uek(v) |
|                 if( alf_luma_coeff_abs[ sfIdx ][ j ] ) | |
|                       alf_luma_coeff_sign[ sfIdx ][ j ] | u(1) |
|             } | |
|         } | |
|         if( alf_luma_clip_flag ) { | |
|             for( sfIdx = 0; sfIdx <= alf_luma_num_filters_signalled_minus1; sfIdx++ ) { | |
|                 for( j = 0; j < 12; j++ ) | |
|                     alf_luma_clip_idx[ sfIdx ][ j ] | u(2) |
|             } | |
|         } | |
|     } | |
|     if( alf_chroma_filter_signal_flag ) { | |
|         alf_chroma_num_alt_filters_minus1 | ue(v) |
|         for( altIdx = 0; altIdx <= alf_chroma_num_alt_filters_minus1; altIdx++ ) { | |
|             alf_chroma_clip_flag[ altIdx ] | u(1) |
|             for( j = 0; j < 6; j++ ) { | |
|                 alf_chroma_coeff_abs[ altIdx ][ j ] | uek(v) |
|                 if( alf_chroma_coeff_abs[ altIdx ][ j ] > 0 ) | |
|                     alf_chroma_coeff_sign[ altIdx ][ j ] | u(1) |
|             } | |
|             if( alf_chroma_clip_flag[ altIdx ] ) { | |
|                 for( j = 0; j < 6; j++ ) | |
|                     alf_chroma_clip_idx[ altIdx ][ j ] | u(2) |
|             } | |
|         } | |
|     } | |

| | |
|---|---|
| if ( alf_cross_component_cb_filter_signal_flag ) { | |
|   alf_cross_component_cb_filters_signalled_minus1 | ue(v) |
|   for( k = 0; k < (alf_cross_component_cb_filters_signalled_minus1+1); k++ ) | |
|     for ( j = 0; j < 8; j++ ) | |
|       alf_cross_component_cb_coeff_plus32[ k ][ j ] | u(6) |
|   } | |
| } | |

2202

| | |
|---|---|
| if ( alf_cross_component_cr_filter_signal_flag ) { | |
|   alf_cross_component_cr_filters_signalled_minus1 | ue(v) |
|   for( k = 0; k < (alf_cross_component_cr_filters_signalled_minus1+1); k++ ) | |
|     for ( j = 0; j < 8; j++ ) | |
|       alf_cross_component_cr_coeff_plus32[ k ][ j ] | u(6) |
|   } | |
| } | |

METHOD AND APPARATUS FOR VIDEO CODING

INCORPORATION BY REFERENCE

This present application is a continuation of U.S. patent application Ser. No. 17/096,674 filed Nov. 12, 2020, and claims the benefit of priority to U.S. Provisional Application No. 62/958,694, "SIGNALING OF CHROMA PRESENT FLAG FOR SUPPORTING VARIOUS CHROMA FORMAT" filed on Jan. 8, 2020, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (180) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can decode a first syntax element from a coded video bitstream. The first syntax element can indicate whether a first component in the coded video bitstream is coded based on a second component in the coded video bitstream. The processing circuitry can determine whether to decode one or more second syntax elements for a chroma related coding tool based on the first syntax element. The chroma related coding tool is one of (i) a luma mapping with chroma scaling (LMCS) coding tool and (ii) a cross-component adaptive loop filter (CC-ALF). The processing circuitry can decode the one or more second syntax elements for the chroma related coding tool based on the first syntax element indicating that the first component is coded based on the second component in the coded video bitstream and the first component is a chroma component. The one or more second syntax elements for the chroma related coding tool are not decoded based on the first syntax element indicating that the first component is not coded based on the second component in the coded video bitstream.

In an embodiment, the first syntax element is signaled in an adaptation parameter set (APS).

In an embodiment, the first syntax element indicates at a sequence level whether the first component is coded based on the second component.

In an embodiment, based on the first syntax element indicating that the first component is coded based on the second component, the second component is one of a second chroma component and a luma component in the coded video bitstream. Based on the first syntax element indicating that the first component is not coded based on the second component, (i) the first component is the only component in the coded video bitstream or (ii) the coded video bitstream includes at least the first component and the second component and the first component is not coded based on the second component. In an example, the coded video bitstream includes a first chroma component, a second chroma component, and a luma component that have a chroma format of 4:4:4. The first component is the first chroma component. The second component is the second chroma component or the luma component. The first chroma component, the second chroma component, and the luma component are coded independently from each other.

In an embodiment, the processing circuitry can disable the chroma related coding tool based on the first syntax element indicating that the first component is not coded based on the second component in the coded video bitstream.

In an embodiment, the chroma related coding tool is the LMCS coding tool. The one or more second syntax elements for the LMCS coding tool includes a first LMCS parameter indicating an absolute value of a variable for LMCS chroma residual scaling (CRS). The processing circuitry can decode a second LMCS parameter for the LMCS coding tool based on the absolute value of the variable for the LMCS CRS being larger than 0. The one or more second syntax elements include the second LMCS parameter that indicates a sign of the variable for the LMCS CRS. The second LMCS parameter for the LMCS coding tool is not decoded based on the absolute value of the variable for the LMCS CRS not being larger than 0.

In an embodiment, the chroma related coding tool is the CC-ALF. The one or more second syntax elements for the CC-ALF include a first CC-ALF flag and a second CC-ALF flag. The first CC-ALF flag indicates whether a first CC-ALF is signaled in the coded video bitstream. The second CC-ALF flag indicates whether a second CC-ALF is signaled in the coded video bitstream. The processing circuitry can decode syntax elements for the first CC-ALF based on the first CC-ALF flag indicating that the first CC-ALF is signaled. The one or more second syntax elements for the CC-ALF include the syntax elements for the first CC-ALF. The syntax elements for the first CC-ALF are not being decoded based on the first CC-ALF flag indicating that the first CC-ALF is not signaled. The processing circuitry can decode syntax elements for the second CC-ALF based on the second CC-ALF flag indicating that the second CC-ALF is signaled. The one or more second syntax elements for the CC-ALF include the syntax elements for the second CC-ALF. The syntax elements for the second CC-ALF are not being decoded based on the second CC-ALF flag indicating that the second CC-ALF is not signaled.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 9A-9G shows an exemplary sequence parameter set (SPS) raw byte sequence payload (RBSP) syntax according to an embodiment of the disclosure.

FIGS. 10A-10D shows an exemplary picture parameter set (PPS) RBSP syntax according to an embodiment of the disclosure.

FIGS. 11A-11B shows an exemplary adaptive loop filter (ALF) data syntax according to an embodiment of the disclosure.

FIG. 12 shows an exemplary SPS RBSP syntax according to an embodiment of the disclosure.

FIG. 13 shows an exemplary SPS RBSP syntax according to an embodiment of the disclosure.

FIG. 14 shows an exemplary PPS RBSP syntax according to an embodiment of the disclosure.

FIG. 15 shows an exemplary APS RBSP syntax according to an embodiment of the disclosure.

FIG. 16 shows an exemplary adaptive loop filter (ALF) data syntax according to an embodiment of the disclosure.

FIG. 21 shows an exemplary LMCS data syntax according to an embodiment of the disclosure.

FIGS. 22A-22B show an exemplary ALF data syntax according to an embodiment of the disclosure.

DETAILED DESCRIPTION OF EMBODIMENTS

Figure 1A:
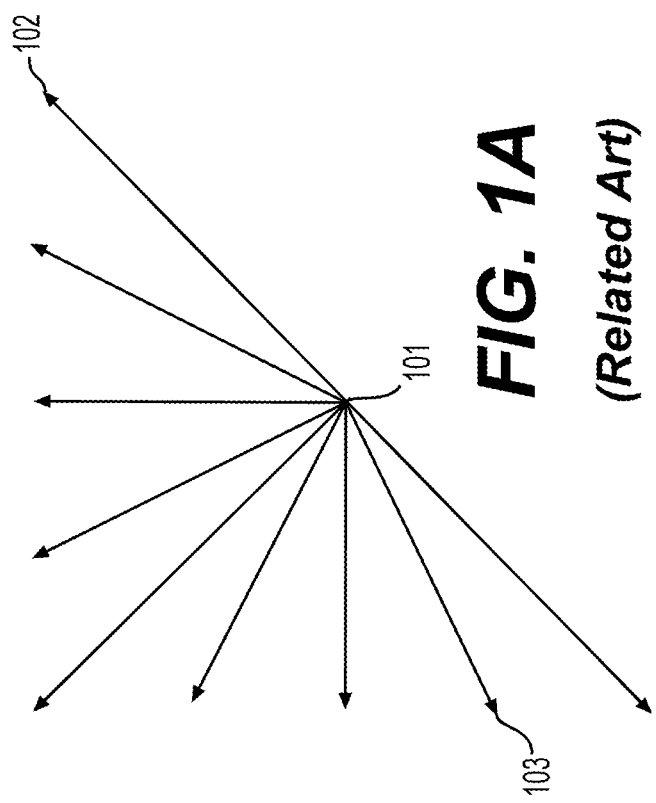
FIG. 1A is a schematic illustration of an exemplary subset of intra prediction modes.
Figure 1B:
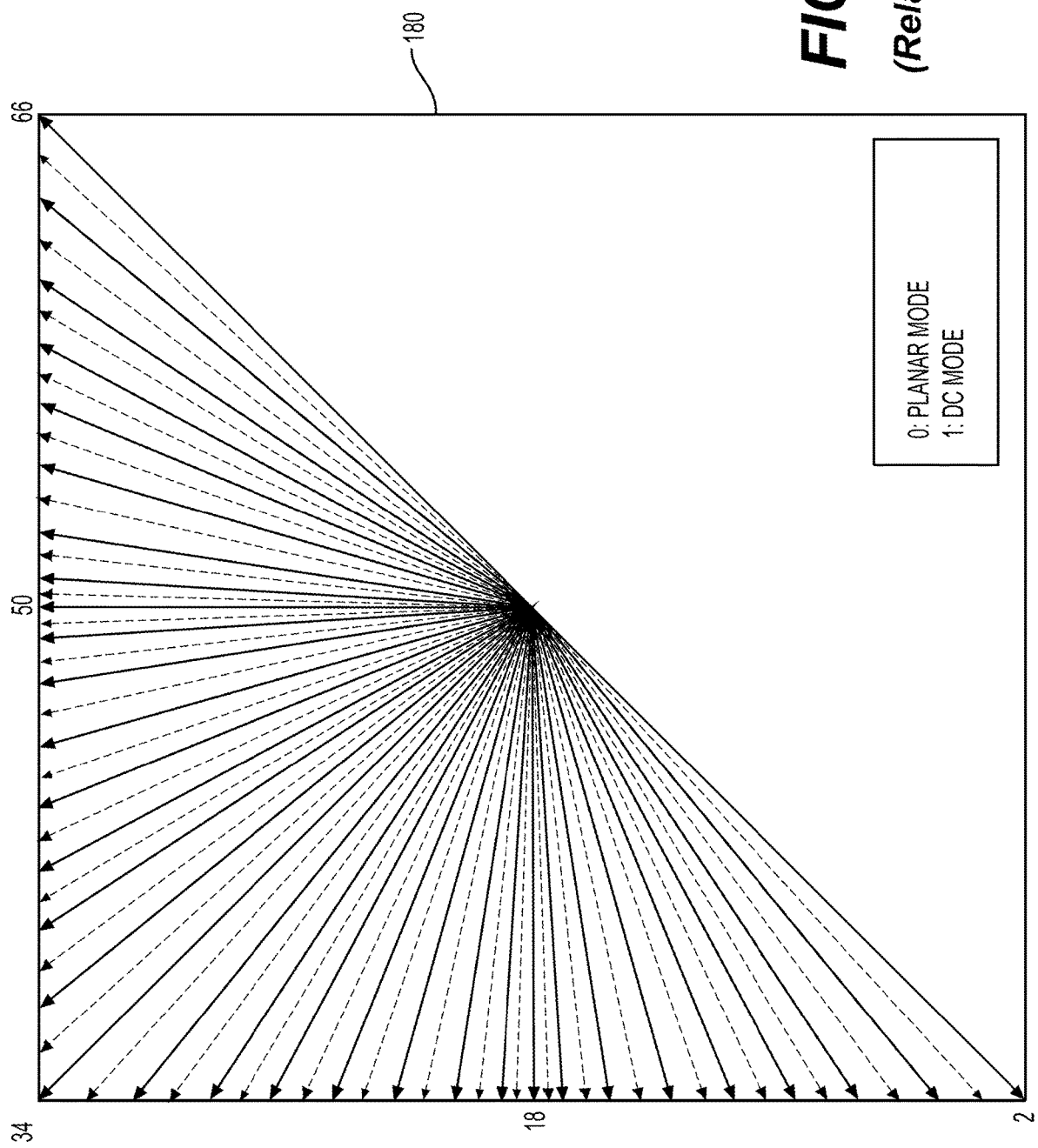
FIG. 1B is an illustration of exemplary intra prediction directions.
Figure 2:
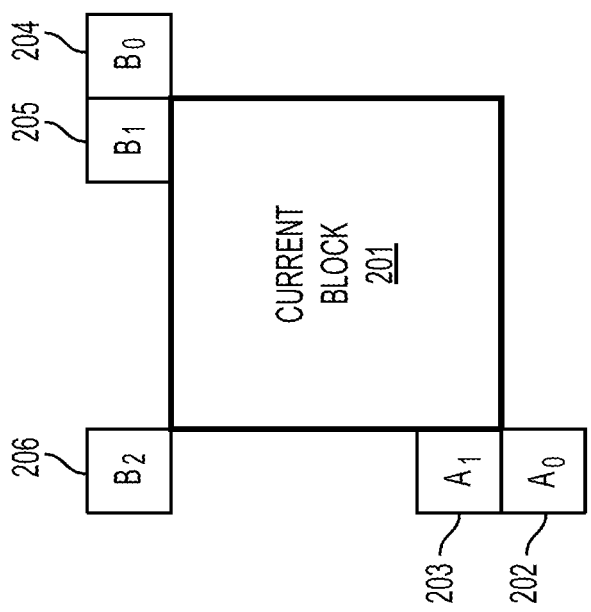
FIG. 2 is a schematic illustration of a current block and its surrounding spatial merge candidates in one example.
Figure 3:
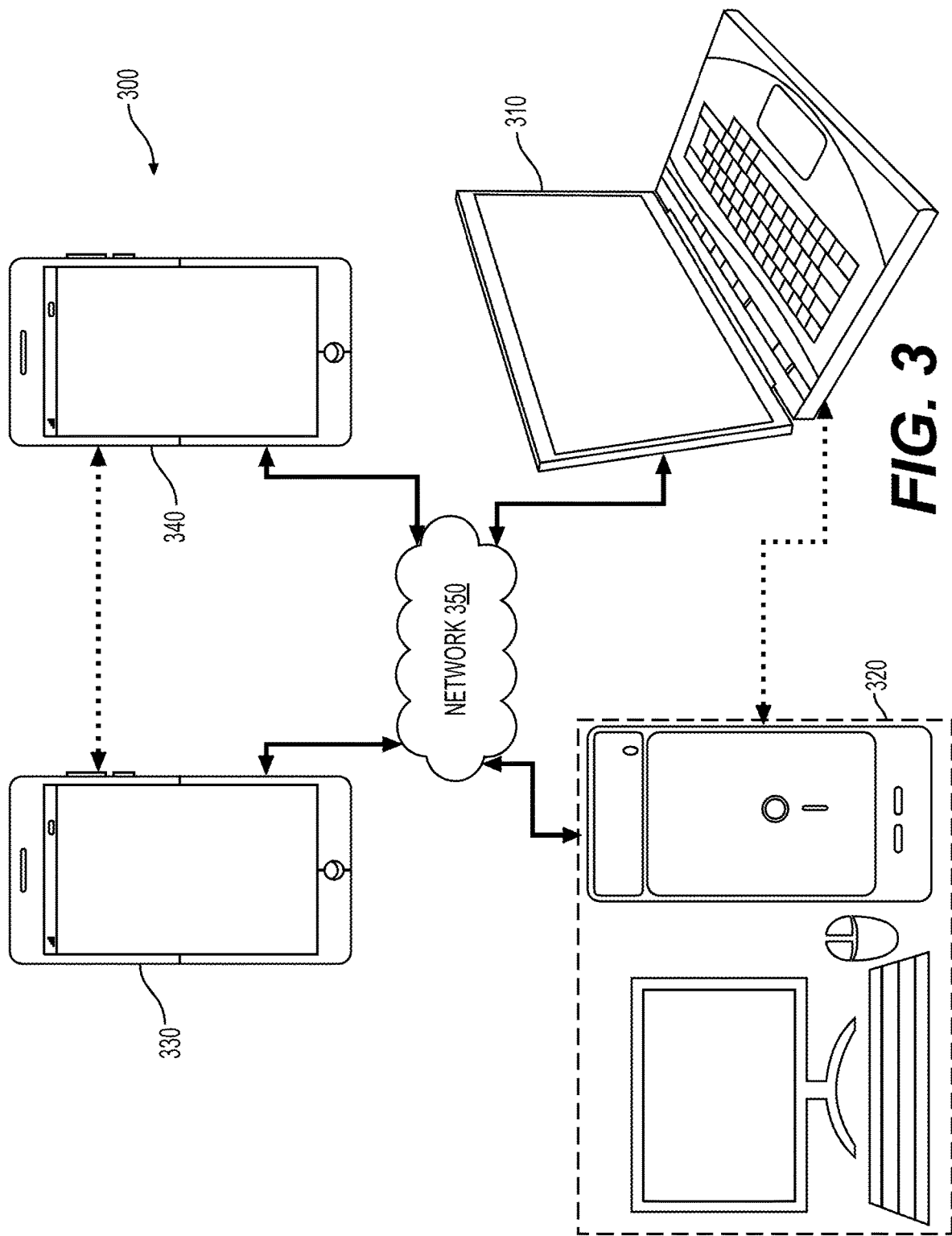
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
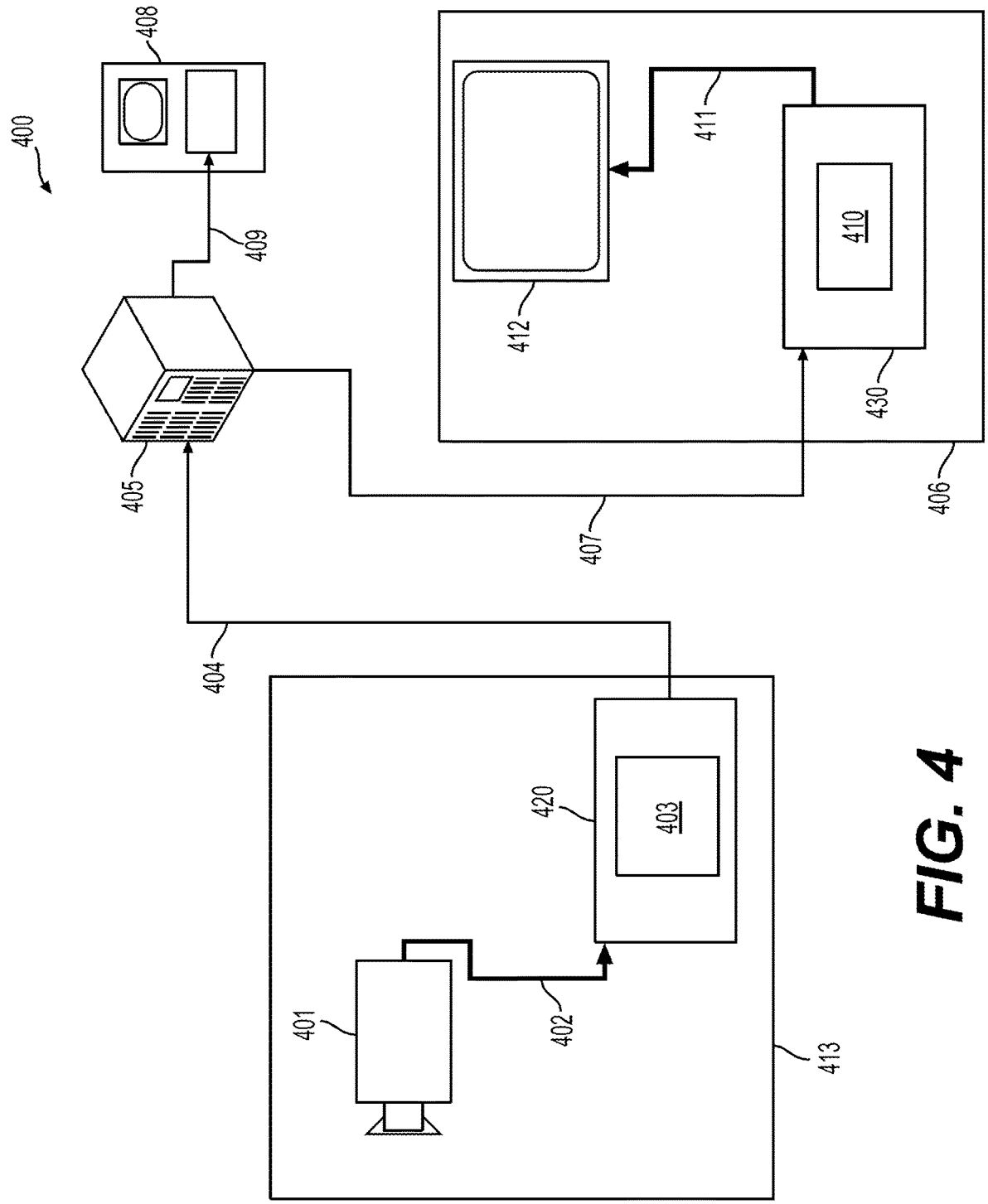
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
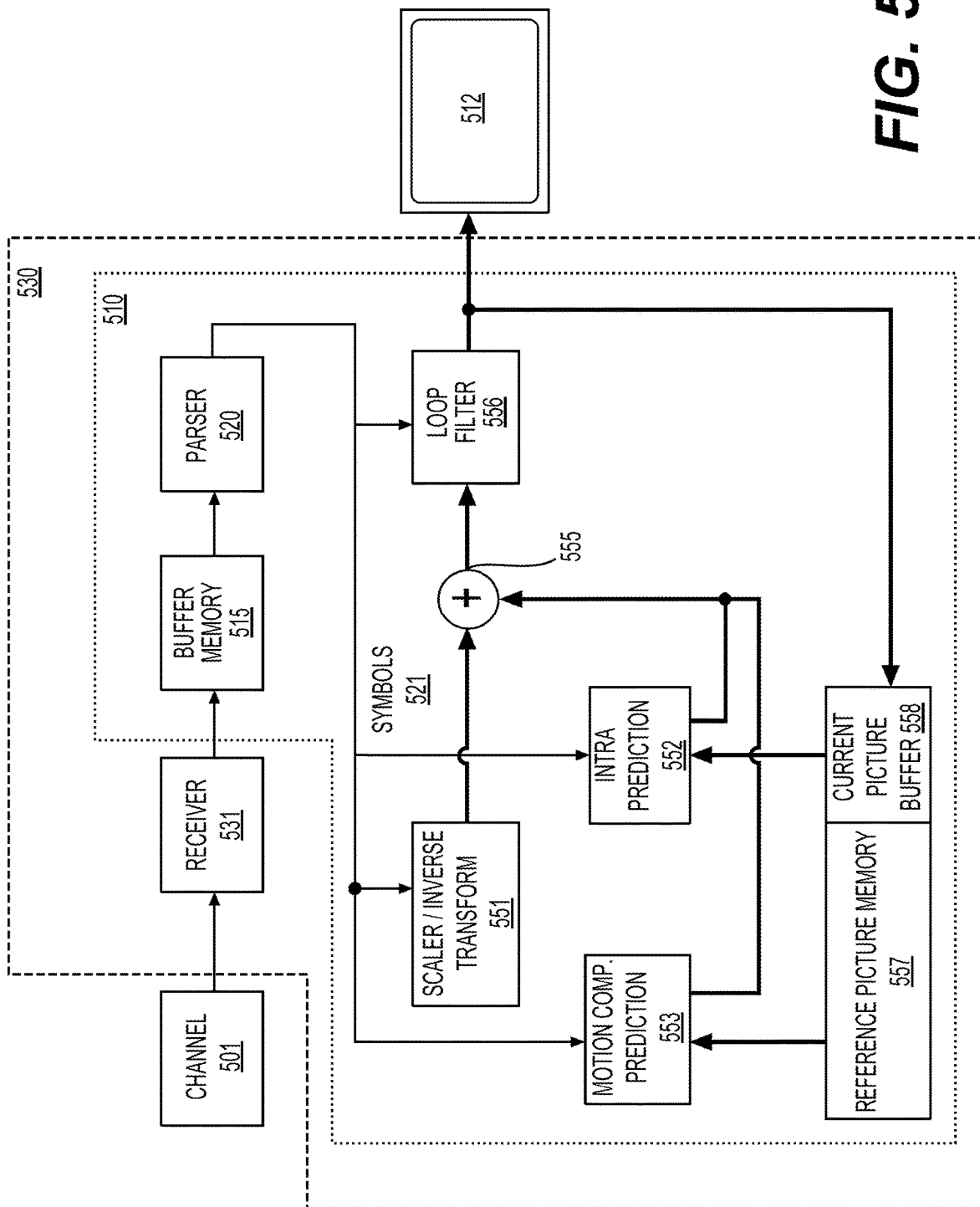
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
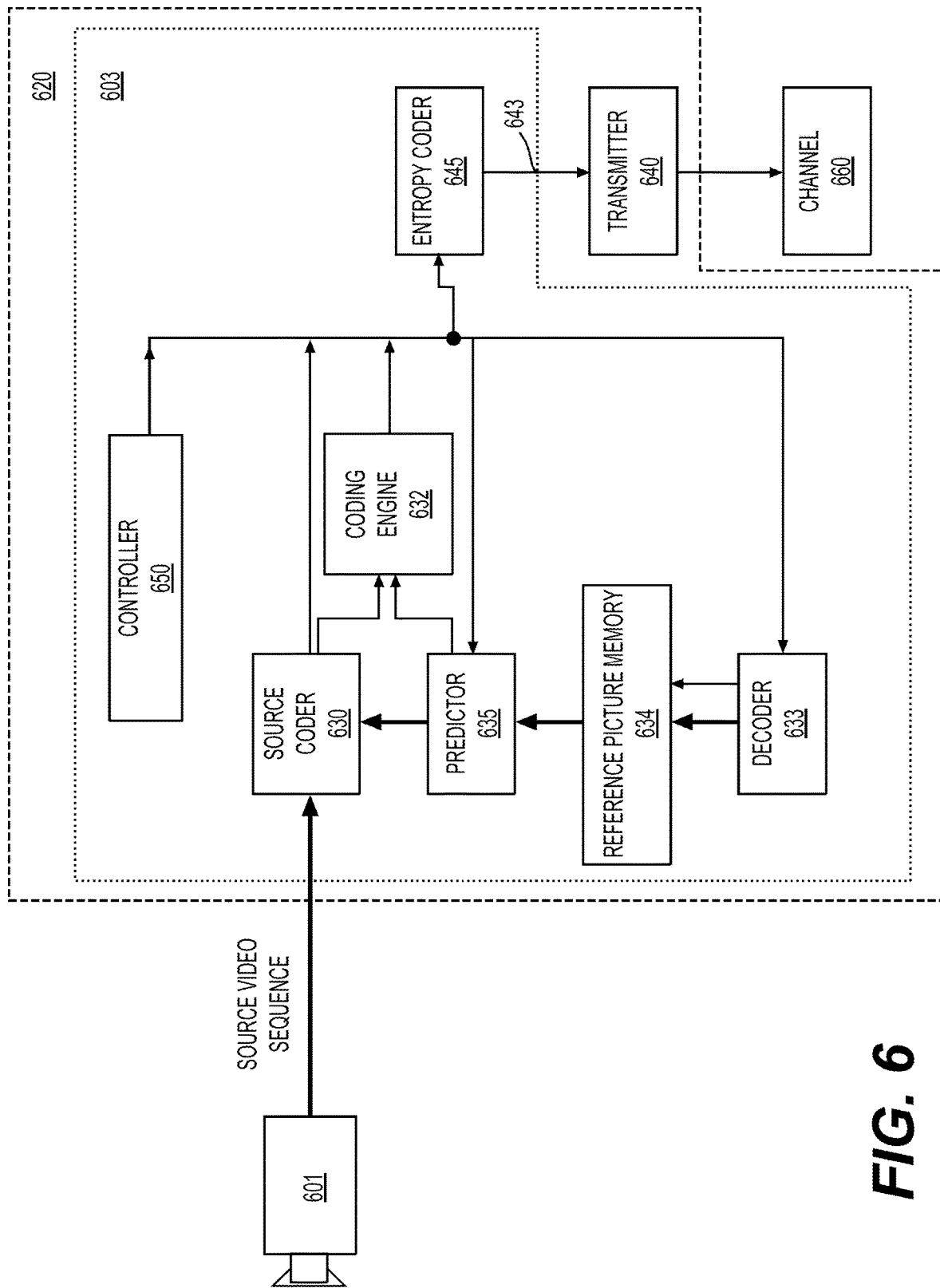
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 YCrCb, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
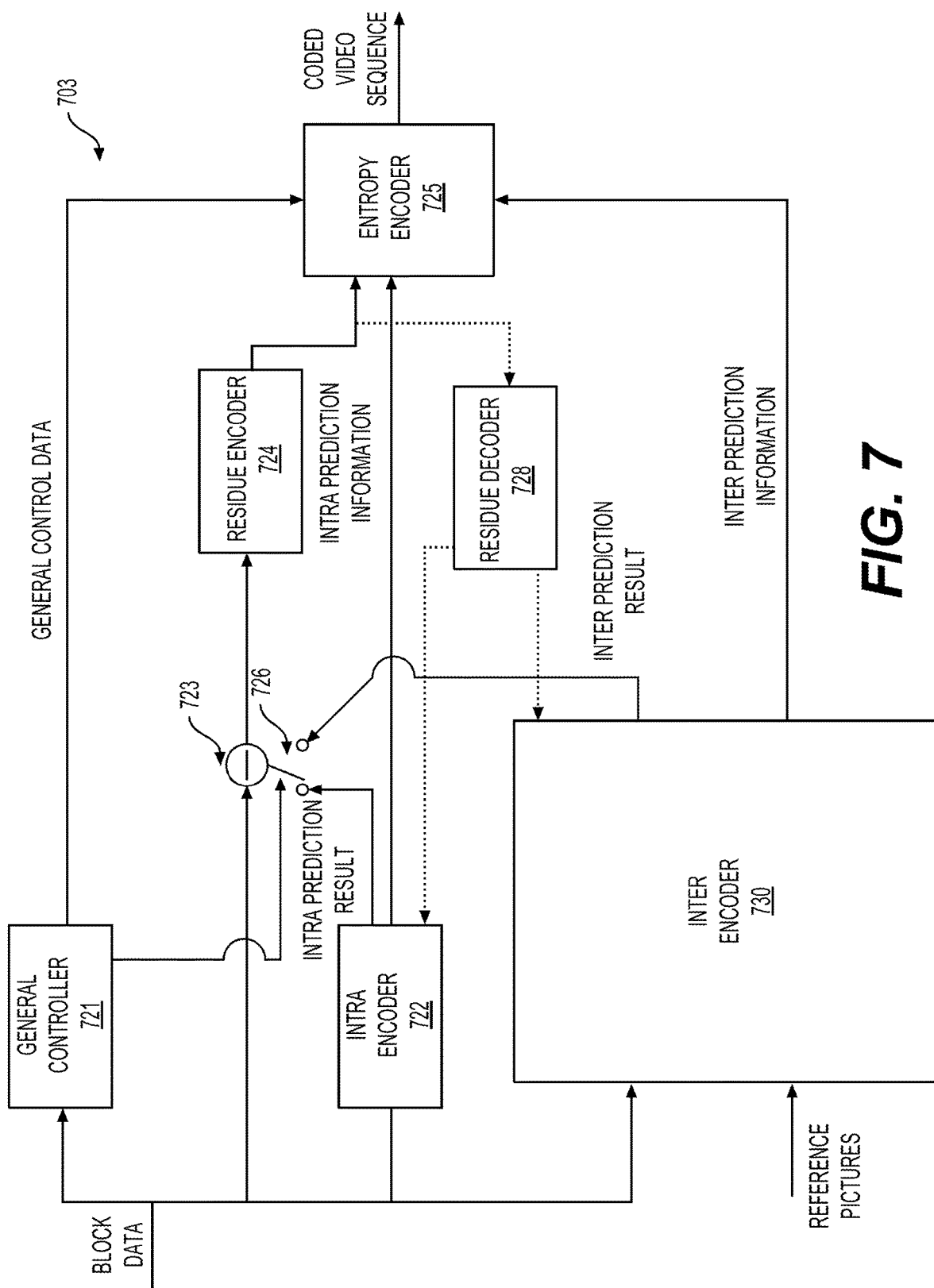
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
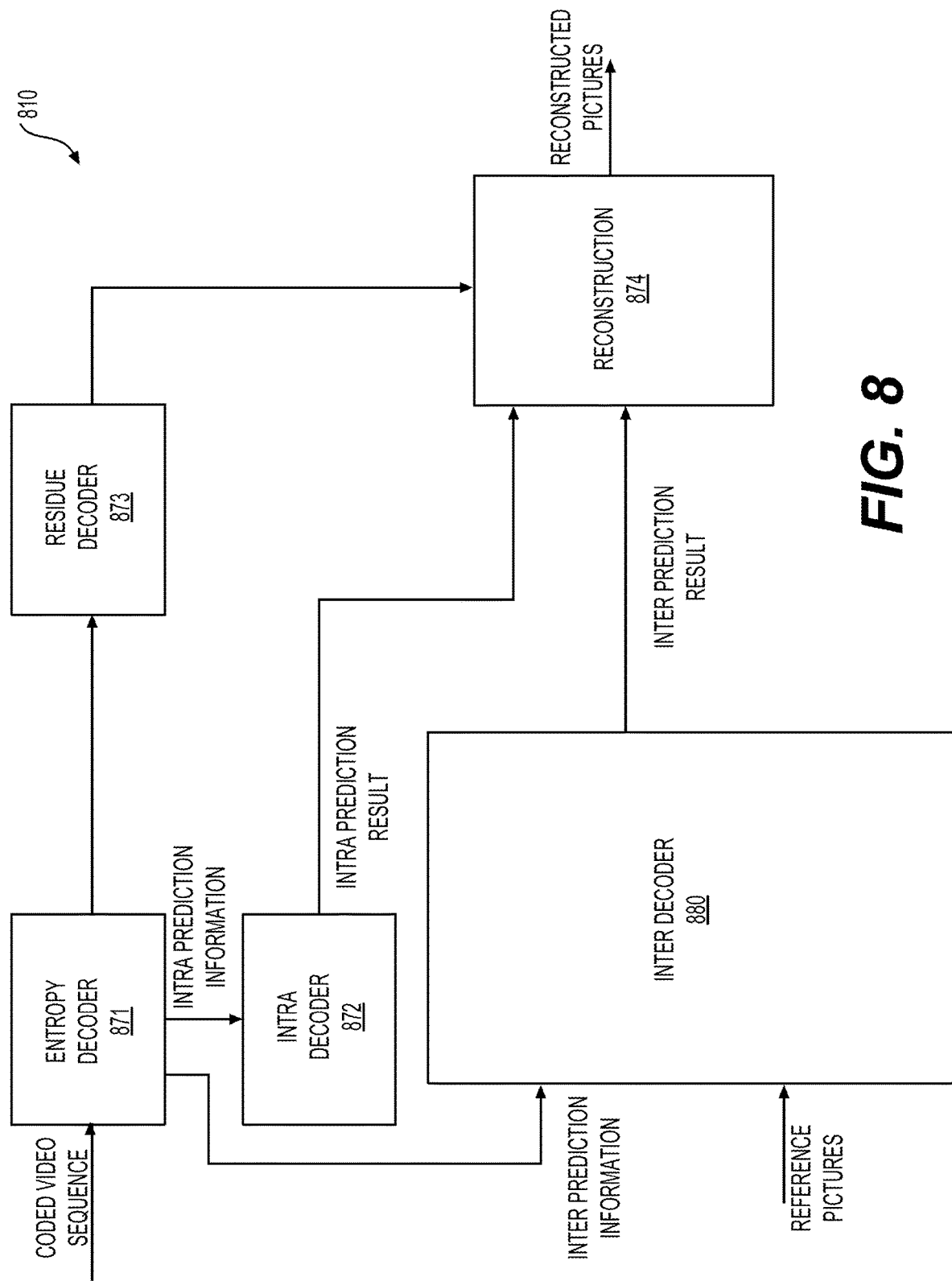
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

A video source, for example, represented by a video bitstream can be a sequence of pictures in a coding order (e.g., an encoding order, a decoding order). The video source (e.g., a coded picture, a sequence of pictures) can include one or more sample arrays (also referred to as components or planes), such as (1) a luma (Y) only (monochrome) component (or a monochromatic component), (2) a luma component and two chroma components (e.g., YCbCr or YCgCo), (3) a green component, a blue component, and a red component (GBR, also known as RGB), and (4) arrays representing other unspecified monochrome or tri-stimulus color samplings (e.g., YZX, also known as XYZ).

As described above, a video source can include multiple components, such as a luma component and two chroma components (e.g., YCbCr or YCgCo), three color components (e.g., RGB), or the like. A component of a video source can refer to a luma component (e.g., Y) or a chroma component (e.g., Cb, Cr, R, G, or B).

When a video source (e.g., a video sequence) includes multiple components, the multiple components can be coded jointly, for example, coding of one (e.g., a first chroma component) of the multiple components can be based or depend on another (e.g., a second chroma component or a luma component) of the multiple components. A chroma component is present in the video source (e.g., the chroma component is present in the jointly coded multiple components), for example, when the chroma component is coded jointly with or based on one of the multiple components.

Alternatively, when a video source (e.g., a video sequence) includes multiple components, the multiple components can be coded independently. For example, coding of one (e.g., a first chroma component) of the multiple components is not based on or does not depend on another one (e.g., a second chroma component or a luma component) of the multiple components. Thus, coding of one (e.g., a first chroma component) of the multiple components is independent from another one (e.g., a second chroma component or a luma component) of the multiple components. The multiple components can be referred to as separately coded multiple components. In an example, the separately coded multiple components are referred to as separately coded multiple color planes or color components.

In an example, a chroma component is not present when a video source only includes a monochromatic component. Alternatively, a chroma component is not present when multiple components in a video source are coded independently or separately. In an example, when the multiple components in the video source are coded independently, each of the multiple components can be treated as a monochromatic component (e.g., a luma component), and thus a chroma component (e.g., a chroma component that is coded based on one of the multiple components) is not present in the video source. When the multiple components in the video source are coded independently, various chroma related coding tools are not needed as each of the multiple components can be treated as a monochromatic component.

In some examples, a video sequence to be encoded includes multiple color planes and different combinations of the multiple color planes may be encoded jointly. In an example, a color plane refers to a luma component or a chroma component. In some applications, a video is monochromatic or color planes of a video are to be encoded independently, thus certain joint color plane coding tools are not applicable. In order to support applications where a monochromatic plane is to be encoded or color planes are to be encoded independently, aspects of the disclosure can provide syntax and semantics, for example, that are beyond Versatile Video Coding (VCC), to disable one or more of the joint color plane coding tools when needed.

A chroma format index (e.g., chroma_format_idc) can indicate a chroma subsampling format (or a chroma format), for example, between chroma block(s) and a corresponding luma block. In an example, when the chroma format index (e.g., the chroma_format_idc) is 0, the chroma format can be 'Monochrome' corresponding to a monochrome sampling having only one sample array, which is nominally considered to be the luma array. When the chroma format index is 1, the chroma format can be 4:2:0 (e.g., each of two chroma arrays has half a height and half a width of a corresponding luma array). When the chroma format index is 2, the chroma format can be 4:2:2 (e.g., each of the two chroma arrays has the same height and half the width of the luma array). When the chroma format index is 3, the chroma format can be 4:4:4, depending on a value of a separate color plane flag (e.g., separate_colour_plane_flag). For example, if the separate color plane flag is equal to 0, the chroma format is 4:4:4 (e.g., each of the two chroma arrays has the same height and width as the luma array). Otherwise, the separate color plane flag is equal to 1, the three color planes can be separately processed as three monochrome sampled pictures.

In some examples, such as in VVC, (i) coding a monochromatic video and/or (ii) separately coding three color components of a 4:4:4 chroma format video are supported. In order to support (i) the coding of a monochromatic video and/or (ii) the coding of three color components of a 4:4:4 chroma format video separately, a variable (or a chroma array type) (e.g., ChromaArrayType) can be defined, for example, in VVC to enable or disable related coding tools. The related coding tool can be applicable or not applicable based on whether an input video is monochromatic and/or whether color components of the input video are required to be encoded separately and independently. In an example, when the input video is monochromatic and/or when the color components of the input video are required to be encoded separately and independently, the related coding tool is not applicable and thus disabled. Otherwise, the related coding tool can be applicable and thus enabled.

In an example, such as in VVC, a value of the chroma array type (e.g., ChromaArrayType) is assigned based on a value of the separate color plane flag (e.g., a separate_colour_plane_flag). In an example, the separate color plane flag (e.g., the separate_colour_plane_flag) indicates whether separately coded color planes are used. If the separate color plane flag (e.g., the separate_colour_plane_flag) is equal to 0 indicating that separately coded color planes are not used, the chroma array type (e.g., ChromaArrayType) is set to be equal to a chroma format (also referred to as a chroma subsampling format, e.g., specified by chroma_format_idc). Otherwise, if the separate color plane flag (e.g., the separate_colour_plane_flag) is equal to 1 indicating that separately coded color planes are used, the chroma array type (e.g., ChromaArrayType) is set to 0.

When the chroma array type (e.g., ChromaArrayType) is 0, the input video can be monochromatic or can have a chroma format of 4:4:4 (or 4:4:4 chroma format) with separately coded color planes. In some examples, it is desirable to disable certain coding tools that are not applicable to a monochromatic video and/or to a video where each color component of the video is encoded as if each component is monochromatic. In some examples, such as in VCC, one or more of the certain coding tools cannot be disabled when the chroma array type (e.g., ChromaArrayType) is 0. For example, the certain coding tools include coding tools enabled by a joint coding flag (e.g., sps_joint_cbcr_enabled_flag) that can indicate a joint coding of chroma residuals and a PPS joint offset present flag (e.g., pps_joint_cbcr_qp_offset_present_flag), respectively. The PPS joint offset present flag can indicate whether a PPS joint CbCr QP offset value and a joint CbCr QP offset list are present in a PPS RBSP syntax structure.

Aspects of the disclosure provide embodiments/methods to disable some coding tools, for example, when an input video is monochromatic, the input video has multiple components that are coded separately (e.g., coding of one of the multiple components is independently from anther of the multiple components). In an example, the input video has the chroma format 4:4:4 with separately coded color planes.

FIGS. 9A-9G show a table of an exemplary sequence parameter set (SPS) raw byte sequence payload (RBSP) syntax, for example, from VVC.

FIGS. 10A-10D show a table of an exemplary picture parameter set (PPS) RBSP syntax, for example, from VVC.

Figure 11B:

FIGS. 11A-11B show a table of an exemplary adaptive loop filter (ALF) data syntax, for example, from VVC.

FIG. 12 shows an exemplary SPS RBSP syntax.

Referring to the table illustrated in FIGS. 9A-9G and FIG. 12, a joint coding flag (e.g., a sps_joint_cbcr_enabled_flag) can indicate a joint coding of chroma residuals. The joint coding flag (e.g., the sps_joint_cbcr_enabled_flag) being equal to 0 can specify that the joint coding of chroma residuals is disabled. The joint coding flag (e.g., the sps_joint_cbcr_enabled_flag) being equal to 1 can specify that the joint coding of chroma residuals is enabled. When the joint coding flag (e.g., the sps_joint_cbcr_enabled_flag) is not present, the joint coding flag (e.g., the sps_joint_cbcr_enabled_flag) can be inferred to be a default value, such as 0.

Referring to a box (910) in FIG. 9D, the joint coding flag (e.g., the sps_joint_cbcr_enabled_flag) can be signaled regardless of a value of the chroma array type (e.g., ChromaArrayType). Referring to boxes (1201)-(1202) in FIG. 12, signaling the joint coding flag (e.g., the sps_joint_cbcr_enabled_flag) is dependent on the chroma array type (e.g., ChromaArrayType). When the chroma array type (e.g., ChromaArrayType) equals to 0, the joint coding flag (e.g., the sps_joint_cbcr_enabled_flag) is not parsed, for example, in the SPS shown in FIG. 12 and can be inferred to be 0. Thus, the joint coding of chroma residuals (e.g., joint Cb and Cr residual coding) as a chroma residual coding is disabled to avoid a decoding process that is unnecessary.

In some examples, when a chroma component is not present in a video bitstream, a chroma present flag is signaled in a PPS, an adaptation parameter set (APS), and/or the like in order not to decode chroma related syntax element(s). The chroma present flag can be signaled in the PPS as a PPS chroma present flag (e.g., a pps_chromat_present_flag), in the APS as an APS chroma present flag (e.g., an aps_chromat_present_flag), and/or the like to indicate whether the chroma component is present or not in the video bitstream, such as in a video sequence. In an example, the chroma component is present when the chroma component is jointly coded with another component (e.g., a luma component, another chroma component).

The PPS chroma present flag (e.g., the pps_chromat_present_flag) can specify whether a chroma component is present. When the PPS chroma present flag (e.g., the pps_chromat_present_flag) equals to 1, the chroma component is present, and the chroma related syntax can be present in a PPS. The PPS chroma present flag (e.g., the pps_chromat_present_flag) being equal to 0 can specify that the chroma component is not present. A requirement of bitstream conformance can be that the PPS chroma present flag (e.g., the pps_chromat_present_flag) is equal to 0 when the chroma array type (e.g., ChromaArrayType) is equal to 0.

The APS chroma present flag (e.g., the aps_chroma_present_flag) can specify whether a chroma component is present. When the APS chroma present flag (e.g., the aps_chroma_present_flag) equals to 1, the chroma component is present, and thus chroma related syntax(es) can be present in an APS. The APS chroma present flag (e.g., the aps_chroma_present_flag) being equal to 0 can specify that the chroma component is not present and the chroma related syntax(es) are not present. A requirement of bitstream conformance can be that the APS chroma present flag (e.g., the aps_chroma_present_flag) equals to 0 when the chroma array type (e.g., ChromaArrayType) equals to 0.

To ensure there are no conflicts in the signaling of the chroma array type (e.g., ChromaArrayType) and the related syntax elements, the SPS RBSP syntax in FIGS. 9A-9G, the PPS RBSP syntax in FIGS. 10A-10D and the ALF data syntax in FIGS. 11A-11B can be modified as shown in FIGS. 13-16. The changes are highlighted using boxes and texts with strikethroughs indicating deleted texts.

Referring to boxes (911)-(912) in FIGS. 9E-9F, the chroma format (e.g., chroma_format_idc) being equal to 3 can refer to the chroma format of 4:4:4 with the separate color plane flag (e.g., the separate_colour_plane_flag) being 0 or 1. Thus, a SPS block-based delta pulse code modulation (BDPCM) chroma enabled flag (e.g., a sps_bdpcm_chroma_enabled_flag), a SPS palette enabled flag (e.g., a sps_palette_enabled_flag), and a SPS adaptive color transform (ACT) enabled flag (e.g., a sps_act_enabled_flag) that indicate chroma-only coding tool(s) and/or coding tools that use chroma component(s) are signaled regardless of a value of the separate color plane flag (e.g., the separate_colour_plane_flag). Comparing the boxes (911)-(912) in FIGS. 9E-9F and boxes (1301)-(1302) in FIG. 13, respectively, the chroma array type (e.g., ChromaArrayType) in FIG. 13 can replace the chroma format (e.g., chroma_format_idc) in the table shown in FIGS. 9E-9F, and thus a syntax "ChromaArrayType==3" in FIG. 13 can replace a syntax "chroma_format_idc==3" in the table shown in FIGS. 9E-9F. As described above, the chroma array type (e.g., ChromaArrayType) being equal to 3 can indicate that the chroma format is 4:4:4 and the separate color plane flag (e.g., the separate_colour_plane_flag) is 0. Accordingly, the SPS BDPCM chroma enabled flag (e.g., the sps_bdpcm_chroma_enabled_flag), the SPS palette enabled flag (e.g., the sps_palette_enabled_flag), and the SPS ACT enabled flag (e.g., the sps_act_enabled_flag) can be signaled only when a value of the chroma array type (e.g., ChromaArrayType) is 3 (e.g., when a chroma component is present and the chroma format is 4:4:4). In an example, when a chroma component is not present, the chroma array type (e.g., ChromaArrayType) is 0, and thus the SPS BDPCM chroma enabled flag (e.g., the sps_bdpcm_chroma_enabled_flag), the SPS palette enabled flag (e.g., the sps_palette_enabled_flag), and the SPS ACT enabled flag (e.g., the sps_act_enabled_flag) are not signaled. Accordingly, flags related to chroma coding tools are not signaled when a chroma component is not present, and thus signaling overhead can be reduced and coding efficiency can be improved.

The PPS QP offsets (e.g., a pps_cb_qp_offset and a pps_cr_qp_offset) can specify offsets to a luma QP (e.g., Qp'Y) used for deriving chroma QPs (e.g., Qp'Cb and Qp'Cr), respectively. Values of the PPS QP offsets (e.g., the pps_cb_qp_offset and the pps_cr_qp_offset) can be in a range of −12 to +12, inclusive. When the chroma array type (e.g., ChromaArrayType) is equal to 0, the PPS QP offsets (e.g., the pps_cb_qp_offset and the pps_cr_qp_offset) are not used in a decoding process and a decoder can ignore the values of the PPS QP offsets.

A PPS joint offset present flag (e.g., a pps_joint_cbcr_qp_offset_present_flag) being equal to 1 can specify that a PPS joint CbCr QP offset value (e.g., a pps_joint_cbcr_qp_offset_value) and a joint CbCr QP offset list (e.g., joint_cbcr_qp_offset_list[i]) are present in a PPS RBSP syntax structure. The PPS joint offset present flag (e.g., the pps_joint_cbcr_qp_offset_present_flag) being equal to 0 can specify that the PPS joint CbCr QP offset value (e.g., the pps_joint_cbcr_qp_offset_value) and the joint CbCr QP offset list (e.g., the joint_cbcr_qp_offset_list[i]) are not present in the PPS RBSP syntax structure. When the PPS joint offset present flag (e.g., the pps_joint_cbcr_qp_offset_present_flag) is not present, the PPS joint offset present flag (e.g., the pps_joint_cbcr_qp_offset_present_flag) can be inferred to be equal to 0.

A PPS slice flag (e.g., a pps_slice_chroma_qp_offsets_present_flag) being equal to 1 can indicate that a slice Cb QP offset (e.g., a slice_cb_qp_offset) syntax element and a slice Cr QP offset (e.g., a slice_cr_qp_offset) syntax element are present in associated slice headers. The PPS slice flag (e.g., the pps_slice_chroma_qp_offsets_present_flag) being equal to 0 can indicate that the slice Cb QP offset (e.g., the slice_cb_qp_offset) syntax element and the slice Cr QP offset (e.g., the slice_cr_qp_offset) syntax element are not present in the associated slice headers. When the PPS slice flag (e.g., the pps_slice_chroma_qp_offsets_present_flag) is not present, the PPS slice flag (e.g., the pps_slice_chroma_qp_offsets_present_flag) can be inferred to be equal to 0.

A PPS CU flag (e.g., a pps_cu_chroma_qp_offset_list_enabled_flag) being equal to 1 can specify that an intra slice (e.g., a pic_cu_chroma_qp_offset_subdiv_intra_slice) syntax element and an inter slice (e.g., a pic_cu_chroma_qp_offset_subdiv_inter_slice) syntax element are present in picture headers referring to the PPS and that a CU flag (e.g., a cu_chroma_qp_offset_flag) may be present in a transform unit syntax and a palette coding syntax. The PPS CU flag (e.g., the pps_cu_chroma_qp_offset_list_enabled_flag) being equal to 0 can specify that the intra slice (e.g., the pic_cu_chroma_qp_offset_subdiv_intra_slice) syntax element and the inter slice (e.g., the pic_cu_chroma_qp_offset_subdiv_inter_slice) syntax element are not present in the picture headers referring to the PPS and that the CU flag (e.g., the cu_chroma_qp_offset_flag) is not present in the transform unit syntax and the palette coding syntax. When the PPS CU flag (e.g., the pps_cu_chroma_qp_offset_list_enabled_flag) is not present, the PPS CU flag (e.g., the pps_cu_chroma_qp_offset_list_enabled_flag) can be inferred to be equal to 0.

Referring to boxes (1001)-(1002) in FIG. 10C, certain PPS syntax, such as the PPS quantization parameter (QP) offsets (e.g., the pps_cb_qp_offset and the pps_cr_qp_offset) for respective chroma components (e.g., a Cb component and a Cr component), the PPS joint offset present flag (e.g., the pps_joint_cbcr_qp_offset_present_flag), the PPS slice flag (e.g., the pps_slice_chroma_qp_offsets_present_flag), and/or the PPS CU flag (e.g., a pps_cu_chroma_qp_offset_list_enabled_flag), that indicate chroma related information can be signaled in the PPS RSRP syntax, for example, whether a chroma component is present or not, as shown in FIGS. 10A-10D. Referring to FIG. 14, when the PPS chroma present flag (e.g., the pps_chromat_present_flag) is 1 indicating that a chroma component is present, the PPS syntax, such as the PPS QP offsets (e.g., the pps_cb_qp_offset and the pps_cr_qp_offset), the PPS joint offset present flag (e.g., the pps_joint_cbcr_qp_offset_present_flag), the PPS slice flag (e.g., the pps_slice_chroma_qp_offsets_present_flag), and/or the PPS CU flag (e.g., the pps_cu_chroma_qp_offset_list_enabled_flag), that indicate the chroma related information can be signaled in a PPS RSRP syntax. Otherwise, when the PPS chroma present flag (e.g., the pps_chromat_present_flag) is 0 indicating that a chroma component is not present, the PPS syntax is not signaled. Thus, coding efficiency can be improved.

When the chroma array type (e.g., ChromaArrayType) is 0, a video source can have a single component (e.g., a monochromatic component) or the video source can have the chroma format 4:4:4 with multiple components and the multiple components are coded separately or independently. Accordingly, a chroma component, for example, that is coded based on another component is not present. Thus, when the chroma array type (e.g., ChromaArrayType) is 0, a video component can be encoded as if the video component is monochromatic or has the chroma format 4:4:4 with separately coded color planes.

Figure 17:
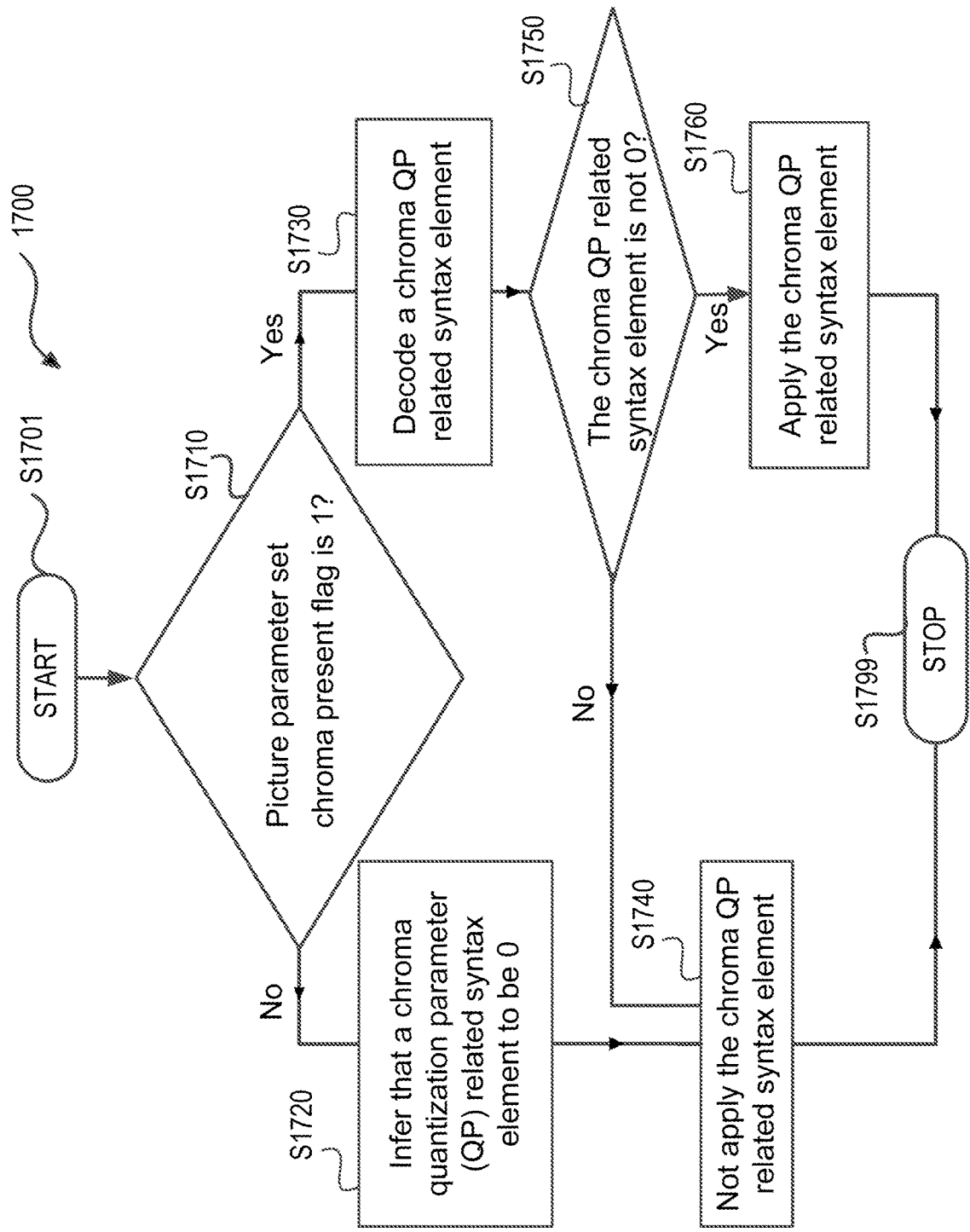
FIG. 17 shows a flow chart outlining a process (1700) according to an embodiment of the disclosure.

FIG. 17 shows a flow chart outlining a process (1700) according to an embodiment of the disclosure. Chroma QP related syntax parsing can be disabled when the PPS chroma present flag (e.g., the pps_chroma_present_flag) is 0 indicating that a chroma component is not present, for example, to avoid an unnecessary decoding process. Syntax elements including the PPS QP offsets (e.g., the pps_cb_qp_offset and the pps_cr_qp_offset), the PPS joint offset present flag (e.g., the pps_joint_cbcr_qp_offset_present_flag), the PPS slice flag (e.g., the pps_slice_chroma_qp_offsets_present_flag), and/or the PPS CU flag (e.g., the pps_cu_chroma_qp_offset_list_enabled_flag) can be inferred to be 0, and thus not applied in the QP derivation process in a decoder side.

In an example, the process (1700) starts at (S1701) and proceeds to (S1710).

At (S1710), whether the PPS chroma present flag is 1 can be determined. When the PPS chroma present flag is determined not to be 1, the process (1700) proceeds to (S1720). Otherwise, when the PPS chroma present flag is determined to be 1, the process (1700) proceeds to (S1730).

At (S1720), a chroma QP related syntax element, for example, one of the PPS QP offsets (e.g., the pps_cb_qp_offset and the pps_cr_qp_offset), the PPS joint offset present flag (e.g., the pps_joint_cbcr_qp_offset_present_flag), the PPS slice flag (e.g., the pps_slice_chroma_qp_offsets_present_flag), the PPS CU flag (e.g., the pps_cu_chroma_qp_offset_list_enabled_flag), and the like can be inferred to be 0. The process (1700) proceeds to (S1740).

At (S1740), the chroma QP related syntax element that is 0 is not applied. The process (1700) proceeds to (S1799), and terminates.

At (S1730), the chroma QP related syntax element can be decoded. The process (1700) proceeds to (S1750).

At (S1750), whether the chroma QP related syntax element is not 0 can be determined. When the chroma QP related syntax element is determined to be 0, the process (1700) proceeds to (S1740). Otherwise, when the chroma QP related syntax element is determined not to be 0, the process (1700) proceeds to (S1760).

At (S1760), the chroma QP related syntax element that is not 0 can be applied. The process (1700) proceeds to (S1799), and terminates.

An ALF chroma filter signal flag (e.g., an alf_chroma_filter_signal_flag) being equal to 1 can specify that an ALF chroma filter is signaled. The ALF chroma filter signal flag (e.g., the alf_chroma_filter_signal_flag) being equal to 0 can specify that the ALF chroma filter is not signaled. When the ALF chroma filter signal flag (e.g., the alf_chroma_filter_signal_flag) is not present, the ALF chroma filter signal flag (e.g., the alf_chroma_filter_signal_flag) can be inferred to be equal to 0.

A box (1101) in FIG. 11A indicates that the ALF chroma filter signal flag (e.g., the alf_chroma_filter_signal_flag) is signaled in the ALF data syntax. A box (1102) in FIG. 11B indicates that when the ALF chroma filter signal flag (e.g., the alf_chroma_filter_signal_flag) is 1, ALF chroma filter information for the corresponding ALF chroma filter can be parsed. Referring to a box (1501) in FIG. 15, the ALF chroma present flag (e.g., the alf_chroma_present_flag) is signaled in an APS and can indicate whether a chroma component is present. Referring to a box (1601) in FIG. 16, when the ALF chroma present flag (e.g., the alf_chroma_present_flag) is 1 indicating that the chroma component is present, the ALF chroma filter signal flag (e.g., the alf_chroma_filter_signal_flag) is signaled. Further, referring to a box (1602), when the ALF chroma filter signal flag (e.g., the alf_chroma_filter_signal_flag) is 1, the ALF chroma filter information for the corresponding ALF chroma filter can be parsed. Alternatively, when the ALF chroma present flag (e.g., the alf_chroma_present_flag) is 0 indicating that the chroma component is not present, the ALF chroma filter signal flag (e.g., the alf_chroma_filter_signal_flag) is not signaled. Subsequently, the ALF chroma filter information for the corresponding ALF chroma filter is not parsed, and thus reducing signaling overhead and improving coding efficiency.

Figure 18:
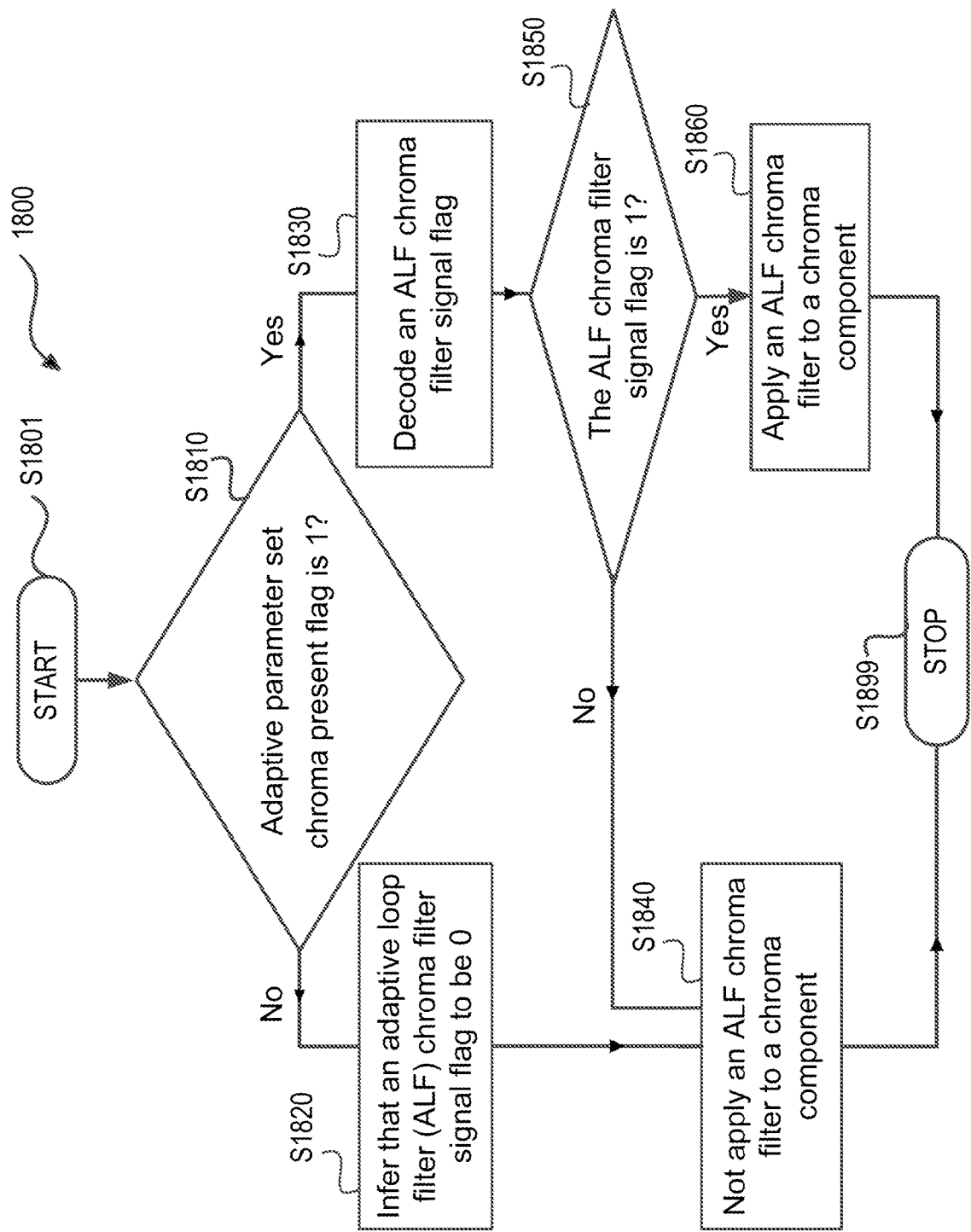
FIG. 18 shows a flow chart outlining a process (1800) according to an embodiment of the disclosure.

FIG. 18 shows a flow chart outlining a process (1800) according to an embodiment of the disclosure. The ALF chroma filter as a chroma filter can be disabled when the APS chroma present flag (e.g., the aps_chroma_present_flag) is 0, for example, to avoid an unnecessary decoding process. Therefore, the ALF chroma filter signal flag (e.g., the alf_chroma_filter_signal_flag) can be inferred to be 0.

In an example, the process (1800) starts at (S1801) and proceeds to (S1810).

At (S1810), whether the APS chroma present flag is 1 can be determined. When the APS chroma present flag is determined not to be 1, and thus a chroma component is not present, the process (1800) proceeds to (S1820). Otherwise, when the APS chroma present flag is determined to be 1, the process (1800) proceeds to (S1830).

At (S1820), the ALF chroma filter signal flag can be inferred to be 0. The process (1800) proceeds to (S1840).

At (S1840), the ALF chroma filter is not applied to a chroma component as the chroma component is not present. The process (1800) proceeds to (S1899), and terminates.

At (S1830), the ALF chroma filter signal flag can be decoded. The process (1800) proceeds to (S1850).

At (S1850), whether the ALF chroma filter signal flag is 1 can be determined. When the ALF chroma filter signal flag is determined not to be 1 (e.g., is 0), the process (1800) proceeds to (S1840). Otherwise, when the ALF chroma filter signal flag is determined to be 1, the process (1800) proceeds to (S1860).

At (S1860), the ALF chroma filter can be applied to the chroma component that is present. The process (1800) proceeds to (S1899), and terminates.

Figure 19:
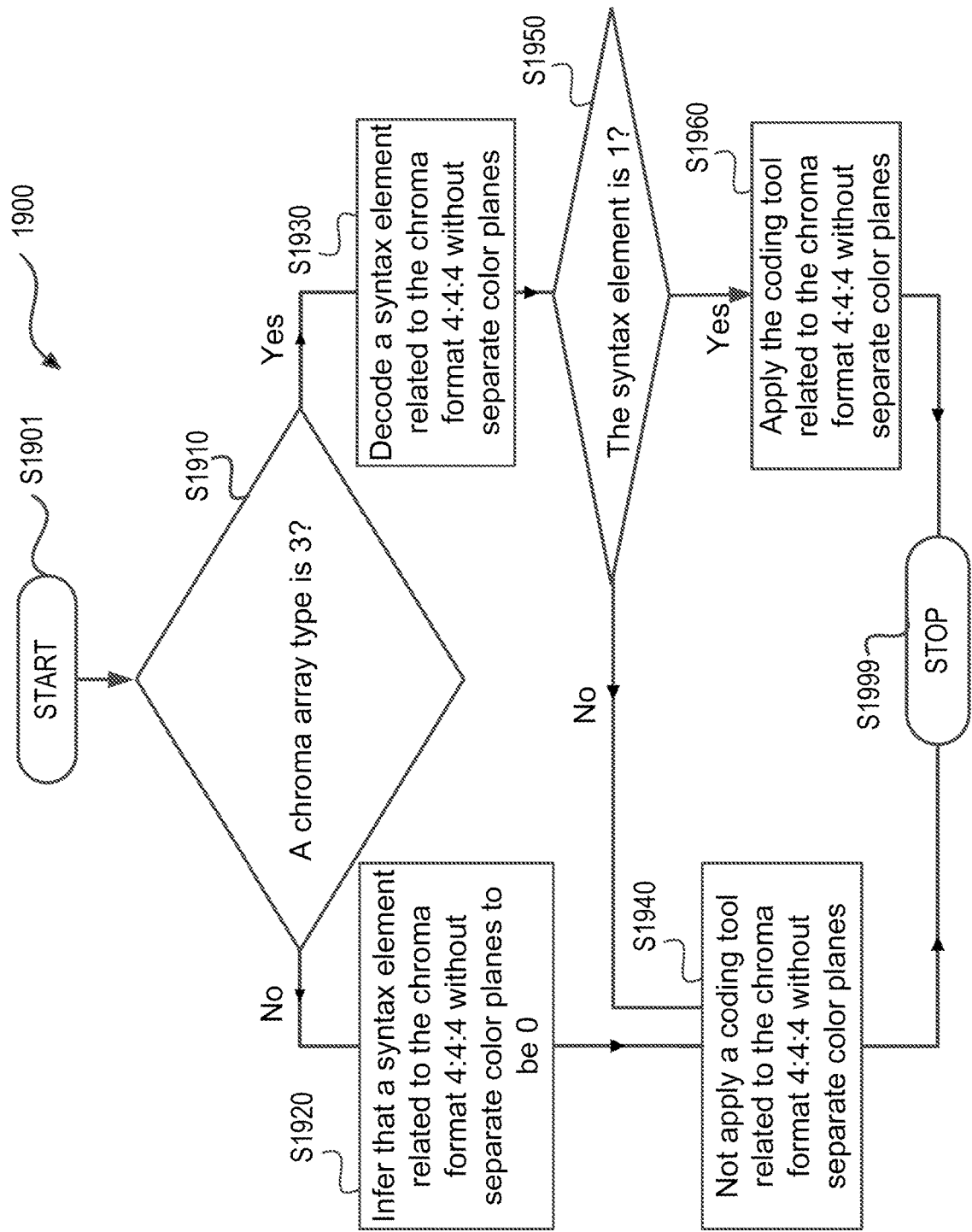
FIG. 19 shows a flow chart outlining a process (1900) according to an embodiment of the disclosure.

FIG. 19 shows a flow chart outlining a process (1900) according to an embodiment of the disclosure. In some examples, such as in VVC, certain coding tools (e.g., BDPCM for chroma, palette mode coding, and ACT) are only applied when the chroma format is 4:4:4 without separate color planes. Syntax elements related to the certain coding tools are not parsed when the chroma format is 4:4:4 with separate color planes (e.g., the chroma component is coded as a luma component). Therefore, only when the chroma array type (e.g., the ChromaArrayType) equals to 3, the syntax elements can be parsed to avoid an unnecessary decoding process.

In an example, the process (1900) starts at (S1901) and proceeds to (S1910).

At (S1910), whether the chroma array type is 3 can be determined. The chroma array type being 3 can indicate the chroma format of 4:4:4 without separate coding planes. When the chroma array type is determined not to be the chroma format of 4:4:4 without separate coding planes, the process (1900) proceeds to (S1920). Otherwise, when the chroma array type is determined to be the chroma format of 4:4:4 without separate coding planes, the process (1900) proceeds to (S1930).

At (S1920), a syntax element, such as the SPS BDPCM chroma enabled flag (e.g., the sps_bdpcm_chroma_enabled_flag), the SPS palette enabled flag (e.g., the sps_palette_enabled_flag), or the SPS ACT enabled flag (e.g., a sps_act_enabled_flag), related to the chroma format of 4:4:4 without separate color planes can be inferred to be 0. The process (1900) proceeds to (S1940).

At (S1940), a coding tool (e.g., the BDPCM, the palette coding, or ACT) related to the chroma format of 4:4:4 without separate color planes is not applied. The process (1900) proceeds to (S1999), and terminates.

At (S1930), the syntax element related to the chroma format of 4:4:4 without separate color planes can be decoded. The process (1900) proceeds to (S1950).

At (S1950), whether the syntax element is 1 can be determined. When the syntax element is determined not to be 1 (e.g., equals to 0), the process (1900) proceeds to (S1940). Otherwise, when the syntax element is determined to be 1, the process (1900) proceeds to (S1960).

At (S1960), the coding tool related to the chroma format of 4:4:4 without separate color planes can be applied. The process (1900) proceeds to (S1999), and terminates.

When a chroma component is not present in a video bitstream, such as monochrome or 4:4:4 with separately coded color planes, it is desirable to not decode chroma related syntax elements in high level syntax such as a SPS, a PPS, an APS, a picture header and/or the like.

To ensure there are no conflicts in the signaling between the chroma array type (e.g., the ChromaArrayType) and the related syntax elements, embodiments and/or methods in the disclosure can modify the SPS RBSP syntax, PPS RBSP syntax, and/or ALF data syntax.

Figure 20:
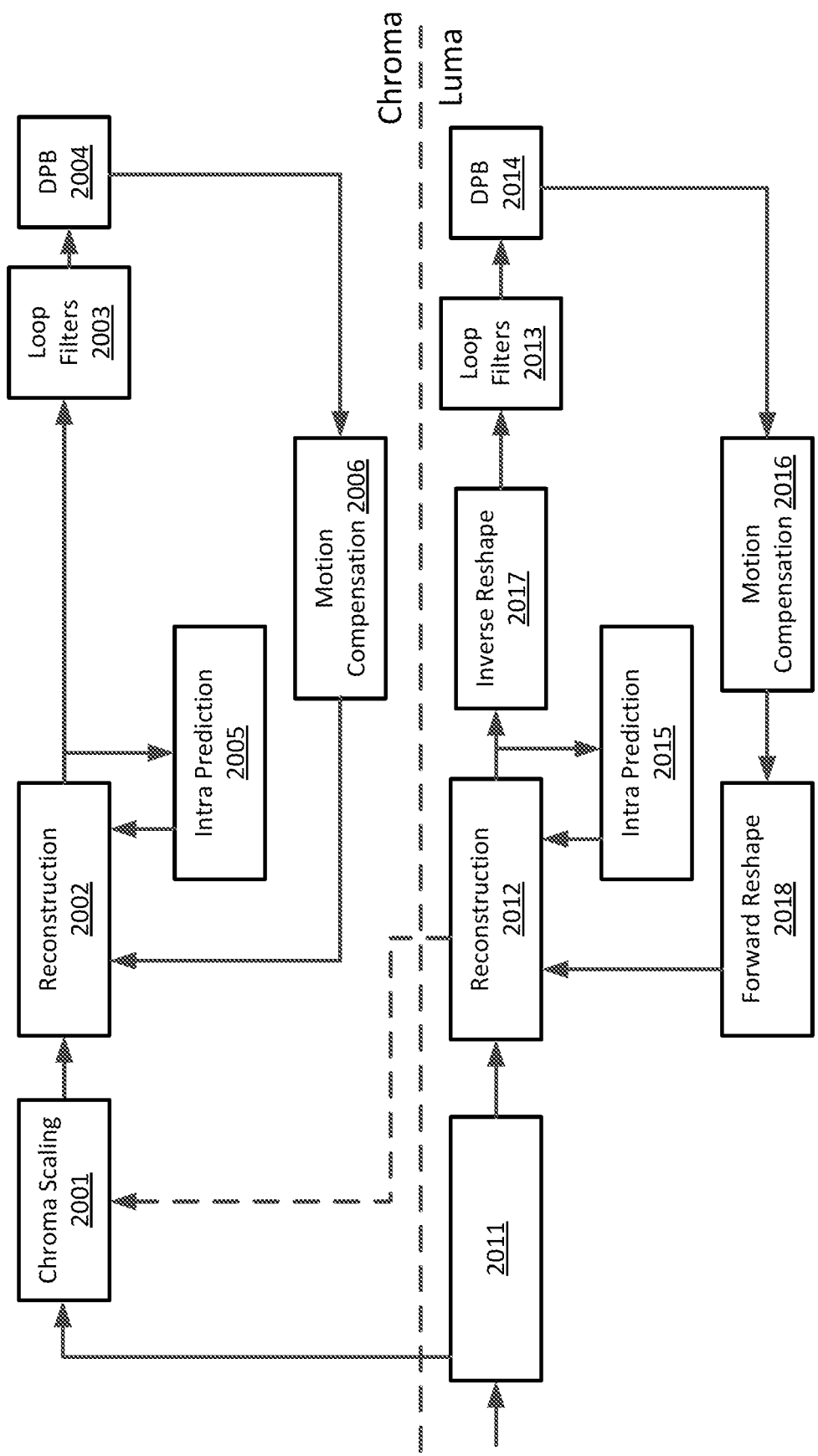
FIG. 20 shows an exemplary architecture of a luma mapping with chroma scaling (LMCS) coding tool according to an embodiment of the disclosure.

FIG. 20 shows an exemplary architecture (e.g., on a decoder side) of a luma mapping with chroma scaling (LMCS) coding tool according to an embodiment of the disclosure. In an example, such as in VVC, the LMCS coding tool is added as a new processing block before loop filters. The LMCS coding tool can include two components: 1) in-loop mapping of a luma component based on adaptive piecewise linear models, 2) luma-dependent chroma residual scaling (CRS) that is applied to chroma component(s). A plurality of blocks (e.g., blocks (2011), (2012), and (2015)) can indicate where the processing is applied in the mapped domain and can include an inverse quantization and inverse transform block (2011), a luma intra prediction block (2015), and a reconstruction block (2012) that can add a luma prediction $Y'_{pred}$ together with a luma residual $Y_{res}$. The luma prediction $Y'_{pred}$ can be from the luma intra prediction block (2015) or a forward mapping block (2018) of a luma signal $Y_{pred}$. The luma signal $Y_{pred}$ can be generated by a motion compensated prediction block (2016) that can have inputs from a decoded picture buffer (DPB) (2014). The DPB (2014) can be a buffer that can store decoded pictures.

A plurality of blocks (e.g., blocks (2002), (2003), (2005), (2006)) can indicate where the processing is applied in a non-mapped domain and can include loop filters (2003) such as deblocking, ALF, and SAO, a motion compensated prediction block (2006), a chroma intra prediction block (2005), a reconstruction block (2002) that can add a chroma prediction $C_{pred}$ together with a chroma residual $C_{res}$, and storage of decoded pictures as reference pictures in a DPB (2004). LMCS functional blocks can include the forward mapping block (2018) of the luma signal $Y_{pred}$, an inverse mapping block (2017) of the luma signal, and a luma-dependent chroma scaling process block (2001). The inverse quantization and inverse transform block (2011) can provide a chroma residual scaling parameter (e.g., $C_{resscale}$) to the luma-dependent chroma scaling process block (2001). The luma-dependent chroma scaling process block (2001) can generate a chroma residual based on the chroma residual scaling parameter (e.g., $C_{resscale}$) and a parameter (e.g., cScaleInv). The parameter (e.g., cScaleInv) can be determined by the reconstruction block (2012) (e.g., based on reconstructed luma neighbor(s), such as a top and/or a left neighbor of a current virtual pipeline data unit (VPDU)). An output of the inverse mapping block (2017) can be filtered by loop filters (2013) and then can be stored in the DPB (2014). The LMCS coding tool can be enabled and/or disabled at the sequence level using an SPS flag.

According to aspects of the disclosure, a first syntax element can be decoded from a coded video bitstream. The first syntax element can indicate whether a first component in the coded video bitstream is coded based on a second component in the coded video bitstream. Whether to decode one or more second syntax elements for a chroma related coding tool can be determined based on the first syntax element. The chroma related coding tool can be a coding tool that is used only for chroma component(s) or a coding tool that uses chroma component(s). In some examples, the chroma related coding tool is one of (i) the LMCS coding tool and (ii) a cross-component adaptive loop filter (CC-ALF).

The one or more second syntax elements for the chroma related coding tool can be decoded based on the first syntax element indicating that the first component is coded based on the second component in the coded video bitstream and the first component is a chroma component. The one or more second syntax elements for the chroma related coding tool are not decoded based on the first syntax element indicating that the first component is coded independently in the coded video bitstream, for example, the first component is not coded based on the second component in the coded video bitstream.

The first syntax element can be signaled in an APS. The first syntax element can be the APS chroma present flag (e.g., the aps_chroma_present_flag). The first syntax element can indicate at a sequence level whether the first component is coded based on the second component.

The first syntax element can indicate whether a chroma component is present in the coded video bitstream.

When the first syntax element indicates that the first component is coded based on the second component, the second component can be one of a second chroma component and a luma component in the coded video bitstream. Accordingly, the chroma component (e.g., the first chroma component) is present in the coded video bitstream.

When the first syntax element indicates that the first component is coded independently, for example, the first component is not coded based on the second component, (i) the first component is the only component in the coded video sequence or (ii) the coded video bitstream includes at least the first component and the second component and the first component is coded independently from the second component. Accordingly, the chroma component is determined not to be present in the coded video bitstream. For example, the coded video bitstream includes at least the first component and the second component that are coded independently. If the first component is a chroma component, the first component can be processed as a monochromatic component or a luma component without a need to use the chroma related coding tool. Thus, a chroma component to be coded based on another component in the coded video bitstream is not present.

In an example, the coded video bitstream includes a first chroma component, a second chroma component, and a luma component that have a chroma format of 4:4:4. The first component is the first chroma component. The second component is the second chroma component or the luma component. The first chroma component, the second chroma component, and the luma component are coded independently from each other.

The chroma related coding tool can be disabled based on the first syntax element indicating that the first component is coded independently in the coded video bitstream, for example, the first component is not coded based on the second component in the coded video bitstream.

In an embodiment, the chroma related coding tool is the LMCS coding tool. The first syntax element can indicate that the first chroma component is coded based on the second component. The one or more second syntax elements for the LMCS coding tool can include a first LMCS parameter indicating an absolute value of a variable (e.g., lmcsDeltaCrs) for LMCS chroma residual scaling (CRS). A second LMCS parameter for the LMCS coding tool can be decoded when the absolute value of the variable for the LMCS CRS is larger than 0. The second LMCS parameter can indicate a sign of the variable for the LMCS CRS. The one or more second syntax elements can include the second LMCS parameter. The second LMCS parameter for the LMCS coding tool is not decoded when the absolute value of the variable for the LMCS CRS is not larger than 0.

The LMCS is a residual scaling tool and can be applied to a luma component and one or more chroma components. When a chroma component is not present in the video bitstream, chroma related syntax elements (e.g., the first LMCS parameter, the second LMCS parameter) for the LMCS coding tool are not needed, for example, in an APS.

The first LMCS parameter (e.g., lmcs_delta_abs_crs) can specify an absolute codeword value of the variable (e.g., lmcsDeltaCrs) for LMCS CRS. When the first LMCS parameter (e.g., lmcs_delta_abs_crs) is not present, the first LMCS parameter (e.g., lmcs_delta_abs_crs) can be inferred to be equal to 0.

The second LMCS parameter (e.g., lmcs_delta_sign_crs_flag) can specify the sign of the variable (e.g., lmcsDeltaCrs). When the second LMCS parameter (e.g., lmcs_delta_sign_crs_flag) is not present, the second LMCS parameter (e.g., lmcs_delta_sign_crs_flag) can be inferred to be equal to 0.

According to aspects of the disclosure, the chroma related syntax elements (e.g., the first LMCS parameter, the second LMCS parameter) for the LMCS coding tool may not be signaled. When the APS chroma present flag (e.g., the aps_chroma_present_flag) is equal to 1, the chroma component is present (e.g., the chroma component is to be coded based on another component in the coded video bitstream), and thus the chroma related syntax for the LMCS coding tool can be signaled in a video bitstream. When the APS chroma present flag (e.g., the aps_chroma_present_flag) is equal to 0, the chroma component is not present and the chroma related syntax for the LMCS coding tool is not signaled in the video bitstream. Thus, the chroma related syntax are not parsed or decoded by a decoder. Accordingly, signaling overhead can be reduced by not signaling the chroma related syntax elements for the LMCS coding tool when the chroma related syntax elements for the LMCS coding tool are not needed and coding efficiency can be improved.

FIG. 21 shows an exemplary LMCS data syntax according to an embodiment of the disclosure. Referring to a box (2101), whether the chroma related syntax for the LMCS coding tool is signaled can be determined based on the APS chroma present flag (e.g., the aps_chroma_present_flag). When the APS chroma present flag (e.g., the aps_chroma_present_flag) is equal to 1, the chroma component is present. In an example, one chroma related syntax element for the LMCS coding tool, such as the first LMCS parameter (e.g., the lmcs_delta_abs_crs) is signaled in a video bitstream. Whether to signal other chroma related syntax element(s) for the LMCS coding tool can be determined based on the first LMCS parameter (e.g., the lmcs_delta_abs_crs). In an example, when the first LMCS parameter (e.g., the lmcs_delta_abs_crs) is larger than 0, the second LMCS parameter (e.g., lmcs_delta_sign_crs_flag) that is a chroma related syntax element for the LMCS coding tool is signaled. Otherwise, the second LMCS parameter (e.g., lmcs_delta_sign_crs_flag) is not signaled.

Referring to the box (2101), when the APS chroma present flag (e.g., the aps_chroma_present_flag) is equal to 0, the chroma component is not present. The chroma related syntax elements for the LMCS coding tool, such as the first LMCS parameter (e.g., the lmcs_delta_abs_crs) and the second LMCS parameter (e.g., lmcs_delta_sign_crs_flag), are not signaled in the video bitstream.

In an embodiment, the chroma related coding tool is the CC-ALF. The first syntax element indicates that the first chroma component is coded based on the second component. The one or more second syntax elements for the CC-ALF can include a first CC-ALF flag and a second CC-ALF flag. The first CC-ALF flag can indicate whether a first CC-ALF is signaled in the coded video bitstream, and the second CC-ALF flag can indicate whether a second CC-ALF is signaled in the coded video bitstream. Syntax elements for the first CC-ALF can be decoded based on the first CC-ALF flag indicating that the first CC-ALF is signaled. The one or more second syntax elements for the CC-ALF can include the syntax elements for the first CC-ALF. The syntax elements for the first CC-ALF are not decoded when the first CC-ALF flag indicates that the first CC-ALF is not signaled.

Syntax elements for the second CC-ALF can be decoded based on the second CC-ALF flag indicating that the second CC-ALF is signaled. The one or more second syntax elements for the CC-ALF can include the syntax elements for the second CC-ALF. The syntax elements for the second CC-ALF are not decoded when the second CC-ALF flag indicates that the second CC-ALF is not signaled.

The CC-ALF is an ALF applied to chroma component(s). Chroma related syntax elements for the CC-ALF can include the first CC-ALF flag (e.g., an alf_cross_component_cb_filter_signal_flag) indicating whether the first CC-ALF is signaled in the coded video bitstream, the second CC-ALF flag (e.g., an alf_cross_component_cr_filter_signal_flag) indicating whether the second CC-ALF is signaled in the coded video bitstream, the syntax elements for the first CC-ALF, the syntax elements for the second CC-ALF, and/or the like.

The first CC-ALF flag (e.g., the alf_cross_component_cb_filter_signal_flag) being equal to 1 can specify that the first CC-ALF (e.g., a cross component Cb filter) is signaled. The first CC-ALF flag (e.g., the alf_cross_component_cb_filter_signal_flag) being equal to 0 can specify that the first CC-ALF (e.g., the cross component Cb filter) is not signaled. When the first CC-ALF flag (e.g., the alf_cross_component_cb_filter_signal_flag) is not present, the first CC-ALF flag (e.g., the alf_cross_component_cb_filter_signal_flag) can be inferred to be 0.

The second CC-ALF flag (e.g., alf_cross_component_cr_filter_signal_flag) being equal to 1 can specify that a second CC-ALF (e.g., a cross component Cr filter) is signaled. The second CC-ALF flag (e.g., the alf_cross_component_cr_filter_signal_flag) being equal to 0 can specify that the second CC-ALF (e.g., the cross component Cr filter) is not signaled. When the second CC-ALF flag (e.g., the alf_cross_component_cr_filter_signal_flag) is not present, the second CC-ALF flag (e.g., the alf_cross_component_cr_filter_signal_flag) can be inferred to be 0.

A chroma component not being present in a video bitstream can indicate that each component in the video bitstream is coded independently as a monochromatic component or a luma component. Thus, the CC-ALF is not needed for the component, and thus the chroma related syntax elements for the CC-ALF are not needed, for example, in an APS. Accordingly, the chroma related syntax elements for the CC-ALF may not be signaled.

When the APS chroma present flag (e.g., the aps_chroma_present_flag) is equal to 1, a chroma component is present, and one or more (e.g., the first CC-ALF flag, the second CC-ALF flag) of the chroma related syntax elements for the CC-ALF can be signaled in the video bitstream. When the APS chroma present flag (e.g., the aps_chroma_present_flag) is equal to 0, the chroma component is not present, and thus the chroma related syntax elements are not signaled in the video bitstream. Accordingly, signaling overhead can be reduced by not signaling the chroma related syntax elements when the chroma related syntax elements for the CC-ALF are not needed and coding efficiency can be improved.

FIGS. 22A-22B show an exemplary ALF data syntax according to an embodiment of the disclosure. Referring to a box (2201), whether one or more of the chroma related syntax elements for the CC-ALF are signaled in the video bitstream can be determined based on the APS chroma present flag (e.g., the aps_chroma_present_flag). When the APS chroma present flag (e.g., the aps_chroma_present_flag) is equal to 1, a chroma component is present, and the one or more (e.g., the first CC-ALF flag, the second CC-ALF flag) of the chroma related syntax elements for the CC-ALF can be signaled in the video bitstream.

Whether additional syntax elements of the chroma related syntax elements for the CC-ALF are signaled can be determined based on the one or more (e.g., the first CC-ALF flag, the second CC-ALF flag) of the chroma related syntax elements for the CC-ALF. Referring to a box (2202), when the first CC-ALF flag is 1, the syntax elements for the first CC-ALF can be signaled in the video bitstream, and thus can be parsed or decoded by a decoder. Referring to a box (2203), when the second CC-ALF flag is 1, the syntax elements for the second CC-ALF can be signaled in the video bitstream, and thus can be parsed or decoded by the decoder.

Referring back to the boxes (2201)-(2203), when the APS chroma present flag (e.g., the aps_chroma_present_flag) is equal to 0, a chroma component is not present, and thus the chroma related syntax elements for the CC-ALF are not signaled in the video bitstream.

Figure 23:
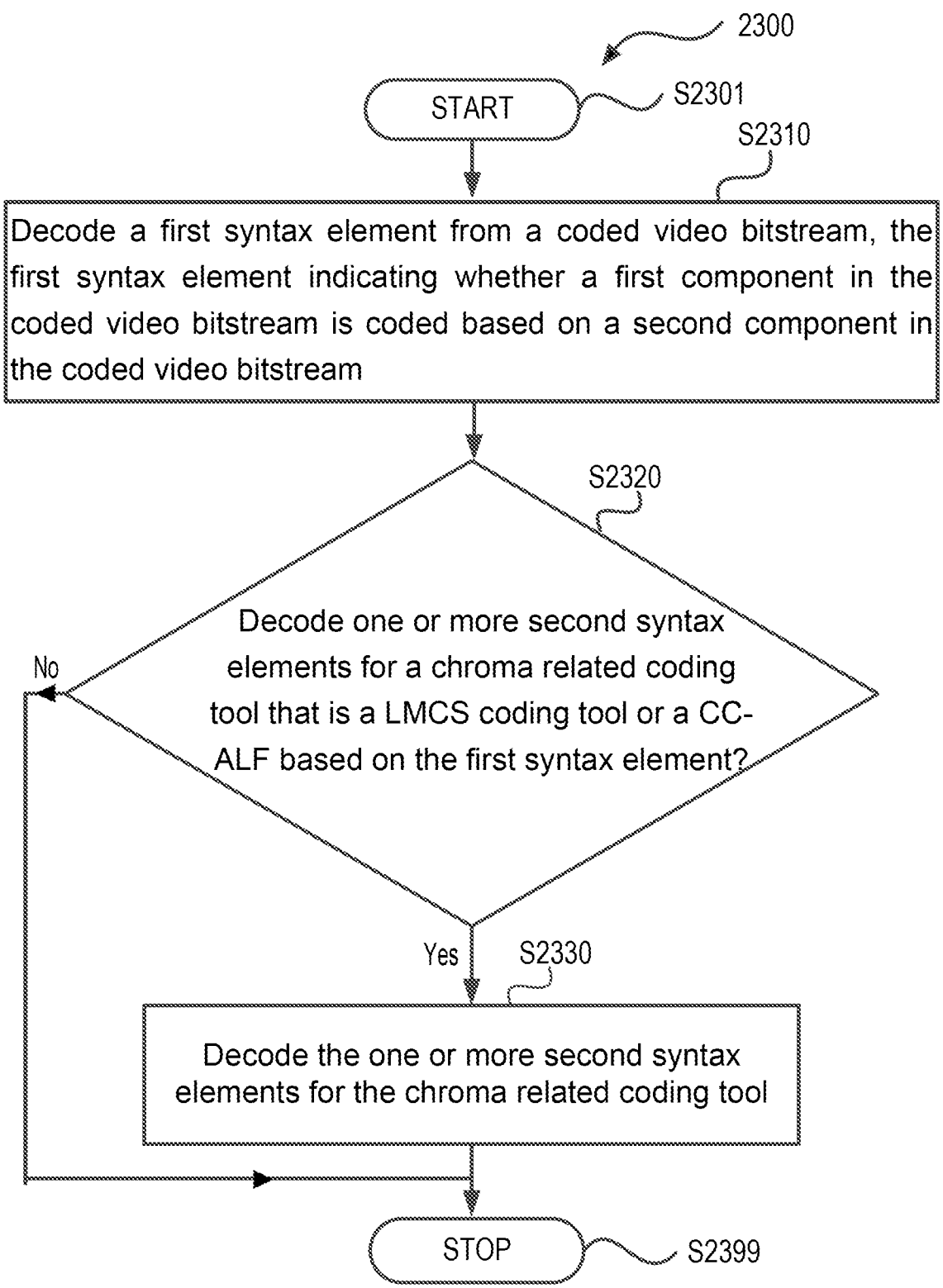
FIG. 23 shows a flow chart outlining a process (2300) according to an embodiment of the disclosure.

FIG. 23 shows a flow chart outlining a process (2300) according to an embodiment of the disclosure. The process (2300) can be used in signaling a chroma present flag (e.g., the APS chroma present flag, the PPS chroma present flag) to support various chroma format and chroma related coding tools (e.g., the LMCS coding tool, the CC-ALF). In various embodiments, the process (2300) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2300) is implemented in software instructions, thus when the processing circuitry executes the software instructions, the processing circuitry performs the process (2300). The process starts at (S2301) and proceeds to (S2310).

At (S2310), a first syntax element can be decoded from a coded video bitstream. The first syntax element can indicate whether a first component in the coded video bitstream is coded based on a second component in the coded video bitstream.

At (S2320), whether to decode one or more second syntax elements for a chroma related coding tool can be determined based on the first syntax element. The chroma related coding tool can be one of (i) a luma mapping with chroma scaling (LMCS) coding tool and (ii) a cross-component adaptive loop filter (CC-ALF). If the first syntax element indicates that the first component is coded based on the second component in the coded video bitstream, the process (2300) proceeds to (S2330). Otherwise, if the first syntax element indicates that the first component is coded independently in the coded video bitstream, for example, the first component is not coded based on the second component in the coded video bitstream, the process (2300) proceeds to (S2399) without decoding the one or more second syntax elements for the chroma related coding tool.

At (S2330), the one or more second syntax elements for the chroma related coding tool can be decoded. The first component can be a first chroma component. The first chroma component is present in the coded video bitstream. The process (2300) proceeds to (S2399) and terminates.

Decoding of the one or more second syntax elements for the chroma related coding tool can be skipped when the chroma present is not present in the coded video bitstream. The chroma related coding tool is not needed, and thus chroma related syntax elements for the chroma related coding tool are not signaled in the coded video bitstream and are not decoded on a decoder side to reduce signaling overhead and improve coding efficiency.

The process (2300) can be suitably adapted. Step(s) in the process (2300) can be modified and/or omitted. Additional step(s) can be added. Any suitable order of implementation can be used. For example, when the maximum number of merge candidates does not satisfy the condition, the picture level parameter is not decoded.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 24 shows a computer system (2400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 24:
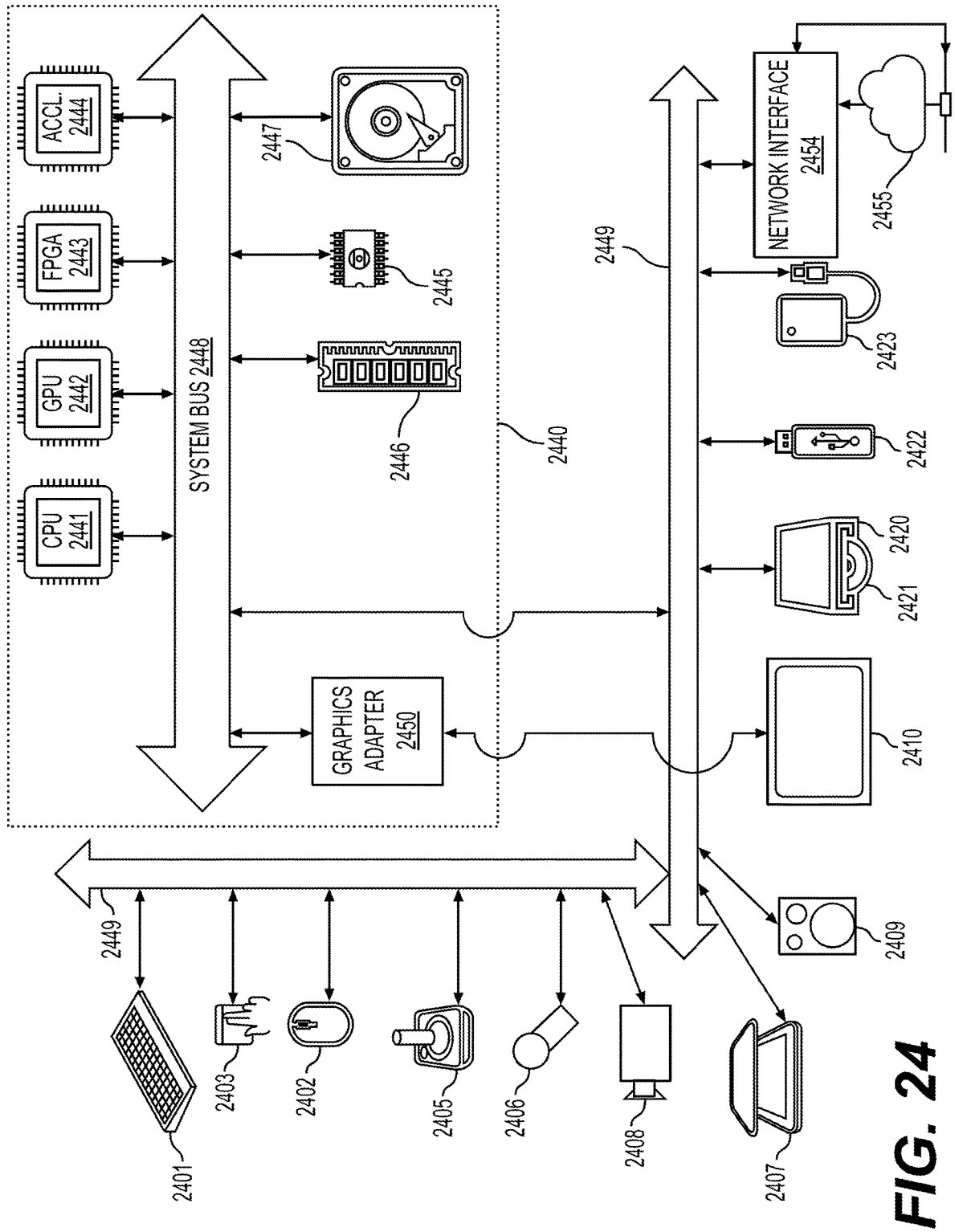
FIG. 24 is a schematic illustration of a computer system in accordance with an embodiment.

The components shown in FIG. 24 for computer system (2400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2400).

Computer system (2400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2401), mouse (2402), trackpad (2403), touch screen (2410), data-glove (not shown), joystick (2405), microphone (2406), scanner (2407), camera (2408).

Computer system (2400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2410), data-glove (not shown), or joystick (2405), but there can also be tactile feedback devices that do not serve as input devices), audio output devices (such as: speakers (2409), headphones (not depicted)), visual output devices (such as screens (2410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2400) can also include human accessible storage devices and their associated media such as optical media including CD/DVD ROM/RW (2420) with CD/DVD or the like media (2421), thumb-drive (2422), removable hard drive or solid state drive (2423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2400) can also include an interface (2454) to one or more communication networks (2455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2449) (such as, for example USB ports of the computer system (2400)); others are commonly integrated into the core of the computer system (2400) by attachment to a system bus as described below (for example Ethernet interface into a PC computer system or cellular network interface into a smartphone computer system). Using any of these networks, computer system (2400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2440) of the computer system (2400).

The core (2440) can include one or more Central Processing Units (CPU) (2441), Graphics Processing Units (GPU) (2442), specialized programmable processing units in the form of Field Programmable Gate Areas (FPGA) (2443), hardware accelerators for certain tasks (2444), graphics adapters (2450) and so forth. These devices, along with Read-only memory (ROM) (2445), Random-access memory (2446), internal mass storage such as internal non-user accessible hard drives, SSDs, and the like (2447), may be connected through a system bus (2448). In some computer systems, the system bus (2448) can be accessible in the form of one or more physical plugs to enable extensions by additional CPUs, GPU, and the like. The peripheral devices can be attached either directly to the core's system bus (2448), or through a peripheral bus (2449). In an example, the screen (2410) can be connected to the graphics adapter (2450). Architectures for a peripheral bus include PCI, USB, and the like.

CPUs (2441), GPUs (2442), FPGAs (2443), and accelerators (2444) can execute certain instructions that, in combination, can make up the aforementioned computer code. That computer code can be stored in ROM (2445) or RAM (2446). Transitional data can be also be stored in RAM (2446), whereas permanent data can be stored for example, in the internal mass storage (2447). Fast storage and retrieve to any of the memory devices can be enabled through the use of cache memory, that can be closely associated with one or more CPU (2441), GPU (2442), mass storage (2447), ROM (2445), RAM (2446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2400), and specifically the core (2440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2440) that are of non-transitory nature, such as core-internal mass storage (2447) or ROM (2445). The software implementing various embodiments of the present disclosure can be stored in such devices and executed by core (2440). A computer-readable medium can include one or more memory devices or chips, according to particular needs. The software can cause the core (2440) and specifically the processors therein (including CPU, GPU, FPGA, and the like) to execute particular processes or particular parts of particular processes described herein, including defining data structures stored in RAM (2446) and modifying such data structures according to the processes defined by the software. In addition or as an alternative, the computer system can provide functionality as a result of logic hardwired or otherwise embodied in a circuit (for example: accelerator (2444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video decoding encoding in an encoder, comprising:
   encoding a first syntax element including a chroma format index chroma_format_idc that indicates a chroma subsampling format, a value of the chroma format index chroma_format_idc being 0 based on a monochrome sampling being used, the value of the chroma format index chroma_format_idc being 1 based on a chroma format being 4:2:0, the value of the chroma format index chroma_format_idc being 2 based on a chroma format being 4:2:2, the value of the chroma format index chroma_format_idc being 3 based on a chroma format being 4:4:4;

determining whether to encode a second syntax element for a cross-component adaptive loop filter (CC-ALF) in response to a chroma component being present; and
encoding the second syntax element for the CC ALF based on element indicating that the chroma component being present, wherein
the second syntax element for the CC-ALF is not encoded based on the monochrome sampling being used.

2. The method of claim 1, wherein the first syntax element is signaled in an adaptation parameter set (APS).

3. The method of claim 1, wherein the first syntax element indicates at a sequence level whether the chroma component is encoded based on another component.

4. The method of claim 1, wherein
based on the chroma component being encoded based on another component, the other component is one of a second chroma component and a luma component.

5. The method of claim 4, further comprising:
generating a coded video bitstream that includes a first chroma component, a second chroma component, and a luma component that have the chroma format of 4:4:4;
the chroma component is the first chroma component;
the other component is the second chroma component or the luma component; and
the first chroma component, the second chroma component, and the luma component are encoded independently from each other.

6. The method of claim 1, further comprising:
disabling the CC-ALF based on the chroma component not being present.

7. The method of claim 1, wherein
the second syntax element for the CC-ALF includes a first CC-ALF flag and a second CC-ALF flag, the first CC-ALF flag indicating whether a first CC-ALF is signaled, the second CC-ALF flag indicating whether a second CC-ALF is signaled;
the encoding the second syntax element further includes encoding syntax elements for the first CC-ALF based on the first CC-ALF being signaled, the second syntax element for the CC-ALF including the syntax elements for the first CC-ALF, the syntax elements for the first CC-ALF not being encoded based on the first CC-ALF not being signaled; and
the encoding the second syntax element further includes encoding syntax elements for the second CC-ALF based on the second CC-ALF being signaled, the second syntax element for the CC-ALF including the syntax elements for the second CC-ALF, the syntax elements for the second CC-ALF not being encoded based on the second CC-ALF not being signaled.

8. An apparatus for video encoding, comprising processing circuitry configured to:
encode a first syntax element including a chroma format index chroma_format_idc that indicates a chroma subsampling format, a value of the chroma format index chroma_format_idc being 0 based on a monochrome sampling being used, the value of the chroma format index chroma_format_idc being 1 based on a chroma format being 4:2:0, the value of the chroma format index chroma_format_idc being 2 based on a chroma format being 4:2:2, the value of the chroma format index chroma_format_idc being 3 based on a chroma format being 4:4:4;
determine whether to encode a second syntax element for a cross-component adaptive loop filter (CC-ALF) in response to a chroma component being present; and
encode the second syntax element for the CC-ALF based on the chroma component being present, wherein
the second syntax element for the CC-ALF is not encoded based on the monochrome sampling being used.

9. The apparatus of claim 8, wherein the first syntax element is signaled in an adaptation parameter set (APS).

10. The apparatus of claim 8, wherein the first syntax element indicates at a sequence level whether the chroma component is encoded based on another component.

11. The apparatus of claim 8, wherein
based on the first syntax element indicating that the chroma component is encoded based on another component, the other component is one of a second chroma component and a luma component.

12. The apparatus of claim 11, wherein
the processing circuitry is configured to generate a coded video bitstream that includes a first chroma component, a second chroma component, and a luma component that have the chroma format of 4:4:4;
the chroma component is the first chroma component;
the other component is the second chroma component or the luma component; and
the first chroma component, the second chroma component, and the luma component are encoded independently from each other.

13. The apparatus of claim 8, wherein the processing circuitry is configured to:
disable the CC-ALF based on the chroma component not being present.

14. The apparatus of claim 8, wherein
the second syntax element for the CC-ALF includes a first CC-ALF flag and a second CC-ALF flag, the first CC-ALF flag indicating whether a first CC-ALF is signaled, the second CC-ALF flag indicating whether a second CC-ALF is signaled;
the processing circuitry is further configured to encode syntax elements for the first CC-ALF based on the first CC-ALF being signaled, the second syntax element for the CC-ALF including the syntax elements for the first CC-ALF, the syntax elements for the first CC-ALF not being encoded based on the first CC-ALF not being signaled; and
the processing circuitry is further configured to encode syntax elements for the second CC-ALF based on the second CC-ALF being signaled, the second syntax element for the CC-ALF including the syntax elements for the second CC-ALF, the syntax elements for the second CC-ALF not being encoded based on the second CC-ALF not being signaled.

15. A non-transitory computer-readable storage medium storing instructions which when executed by a processor cause the processor to perform:
encoding a first syntax element including a chroma format index chroma_format_idc that indicates a chroma subsampling format, a value of the chroma format index chroma_format_idc being 0 based on a monochrome sampling is used, the value of the chroma format index chroma_format_idc being 1 based on a chroma format being 4:2:0, the value of the chroma format index chroma_format_idc being 2 based on a chroma format being 4:2:2, the value of the chroma format index chroma_format_idc being 3 based on a chroma format being 4:4:4;
determining whether to encode a second syntax element for a cross-component adaptive loop filter (CC-ALF) in response to a chroma component being present; and encoding the second syntax element for the CC-ALF based on the first syntax element indicating that the chroma component being present, wherein the second syntax element for the CC-ALF is not encoded based on the monochrome sampling being used.

16. The non-transitory computer-readable storage medium of claim 15, wherein the first syntax element is signaled in an adaptation parameter set (APS).

17. The non-transitory computer-readable storage medium of claim 15, wherein the first syntax element indicates at a sequence level whether the chroma component is encoded based on another component.

18. The non-transitory computer-readable storage medium of claim 15, wherein based on the chroma component being encoded based on another component, the other component is one of a second chroma component and a luma component.

19. The non-transitory computer-readable storage medium of claim 18, wherein the instructions further cause the processor to perform:

generating a coded video bitstream that includes a first chroma component, a second chroma component, and a luma component that have the chroma format of 4:4:4;

the chroma component is the first chroma component;

the other component is the second chroma component or the luma component; and the first chroma component, the second chroma component, and the luma component are encoded independently from each other.

20. The non-transitory computer-readable storage medium of claim 15, wherein the instructions further cause the processor to perform:

disabling the CC-ALF based on the first syntax element indicating that the chroma component not being present.

* * * * *